United States Patent [19]
Kakitani et al.

[11] Patent Number: 5,978,732
[45] Date of Patent: Nov. 2, 1999

[54] ON-VEHICLE PATH GUIDE APPARATUS AND PATH SEARCH METHOD

[75] Inventors: Takashi Kakitani; Masaharu Umezu; Katsuzi Okazaki, all of Tokyo, Japan

[73] Assignee: Mitsubishi Denki Kabushiki Kaisha, Tokyo, Japan

[21] Appl. No.: 08/772,949

[22] Filed: Dec. 24, 1996

[30]  Foreign Application Priority Data

Jun. 24, 1996 [JP] Japan .................................. 8-163502

[51] Int. Cl.⁶ ........................ G01C 21/00; G06F 165/00
[52] U.S. Cl. ........................ 701/209; 701/201; 701/211
[58] Field of Search .................................. 701/201, 202, 701/209, 211; 340/995

[56]  References Cited

U.S. PATENT DOCUMENTS

| | | | |
|---|---|---|---|
| 4,937,753 | 6/1990 | Yamada | 364/449 |
| 5,638,280 | 6/1997 | Nishimura et al. | 364/449 |
| 5,712,788 | 1/1998 | Liaw et al. | 364/449.3 |
| 5,752,217 | 5/1998 | Ishizaki et al. | 701/201 |
| 5,815,161 | 9/1998 | Emmerink et al. | 345/440 |

FOREIGN PATENT DOCUMENTS

| | | |
|---|---|---|
| 63-148115 | 6/1988 | Japan . |
| 63-171377 | 7/1988 | Japan . |
| 1-161111 | 6/1989 | Japan . |
| 2/28800 | 1/1990 | Japan . |
| 2-224200 | 9/1990 | Japan . |

*Primary Examiner*—Michael J. Zanelli
*Attorney, Agent, or Firm*—Sughrue, Mion, Zinn, Macpeak & Seas, PLLC

[57]  ABSTRACT

In an on-vehicle path guide apparatus and a path search method, by using path search network data and path search index data, path search index data searching device searches for a recommended path from a current position of an own vehicle to a set destination in stages and at high speed so as to guide a passenger. The data are selectively used according to a distance to the destination to efficiently search for the recommended path. The path search index data has a hierarchical structure, and a small capacity memory is mounted.

20 Claims, 36 Drawing Sheets

FIG. 10

| | THE CONTENTS OF DECISION |
|---|---|
| DECISION CONDITION | PATH TO ENTRANCE RAMP TO EXPRESSWAY IS COMPLETED |
| | PATH TO EXIT RAMP TO EXPRESSWAY IS COMPLETED |
| | PATH TO ENTRANCE RAMP TO TOLL ROAD IS COMPLETED |
| | PATH TO EXIT RAMP TO TOLL ROAD IS COMPLETED |
| | PATH TO SPECIFIED DISTANCE IS COMPLETED |

FIG. 28

| MESH CODE | ROAD LINK NUMBER | JAM INFORMATION | REGULATION INFORMATION |
|---|---|---|---|
| mesh0 | Rlink00 | NON | NON |
| ⋮ | ⋮ | | |
| mesh0 | Rlink0m | MAJOR JAM | NON |
| ⋮ | ⋮ | ⋮ | ⋮ |
| meshn | Rlinknm | NON | FOUND |

FIG. 29

| ROAD LINK NUMBER | SEARCH ROAD NETWORK DATA LINK NUMBER |
|---|---|
| Rlinkn0 | Slinkni0 |
| Rlinkn1 | |
| ⋮ | ⋮ |
| Rlinknm | Slinknim |

FIG. 32

| COUNT VALUE | DESTINATION CODE | LINK | |
| --- | --- | --- | --- |
| | | MESH CODE | LINK NUMBER |
| 1 | Code k | mesh h | Slink m |
| ⋮ | ⋮ | ⋮ | ⋮ |
| | | | |

ON-VEHICLE PATH GUIDE APPARATUS AND PATH SEARCH METHOD

BACKGROUND OF THE INVENTION

1. Field of the Invention

The present invention relates to an on-vehicle path guide apparatus and a path search method for searching for a recommended path between a current position and a destination at high speed so as to display the path on a map on a display unit such as liquid crystal display or CRT display.

2. Description of the Prior Art

FIG. 41 is a block diagram showing a conventional on-vehicle path guide apparatus disclosed in, for example, JP-A 2/28800. In the drawing, a processor 411 includes a microcomputer having a CPU 417, a ROM 418, a RAM 419, and an input-output interface 420, and the component parts are interconnected through a bus 421.

A traffic information receiver 412 receives, for example, road traffic information sent from a traffic information center through a transmitter mounted to a road guide sign, a signal post, or the like. A compact disc player 413 is used as a read-only external storage containing information such as road map data. A CRT display 414 displays data such as various road traffic information which are converted into display signals in the processor 411. In an operating portion 415, a passenger can input a command by an input equipment such as key switch or light-pen. A self-contained navigation type position sensor 416 includes a geomagnetic sensor, a vehicle speed sensor, and so forth.

In the conventional on-vehicle path guide apparatus shown in FIG. 41, processing is carried out to retrieve depending upon the data such as road traffic information, and a recommended path obtained as a result of processing is provided for the passenger. For this purpose, the recommended path is retrieved and extracted by sequentially executing the following three steps: the first step of determining candidate paths between a current position and a destination, the second step of retrieving a path in which a predetermined condition is met from the candidate paths, and the third step of extracting the recommended path from the paths detected as a result of retrieval in the second step depending upon the various types of traffic information and a path selecting condition. Subsequently, for example, the resultant recommended path and the various types of road traffic information are visually displayed on a display unit such as liquid crystal display or CRT display, or are provided for the passenger through voice via speaker or the like.

The conventional on-vehicle path guide apparatus has the above structure. Hence, when the path search is made, a path cost must be calculated with respect to all the candidate paths depending upon data such as width of a road defined in road map data, length of a road in each section, and the type of road (such as city road, or national road). Consequently, a considerable time is required to provide the passenger with the recommended path to the destination. As a result, there is a problem in that a long time is elapsed before the recommended path is provided for the passenger.

Further, since the recommended path is selected depending upon the result of calculation with respect to all the candidate paths, a considerable time is required to indicate the recommended path. As a result, there is another problem in that the passenger must inconveniently wait for a long time from request to acquisition of the result.

Further, it is necessary to store the result of calculation about all the candidate paths for calculation of the recommended paths, thereby requiring a considerably large memory. As a result, the large memory becomes one factor which sets the on-vehicle path guide apparatus at high prices.

SUMMARY OF THE INVENTION

In order to overcome the above problems, it is an object of the present invention to provide an on-vehicle path guide apparatus which can rapidly search for and provide a recommended path for a passenger, can provide the recommended path for the passenger whenever necessary even in the course of search for the recommended path from a current position to a destination, and requires a smaller memory.

According to one preferred embodiment of the present invention, for achieving the above-mentioned objects, there is provided an on-vehicle path guide apparatus in which path search index data searching means searches at high speed for a recommended path from a main road near a current position to a main road near a destination by using road network data in path search road network data storage means and path search index data stored in path search index data storage means and created with path information to each intersection as index, and a result of search is provided for a passenger through indicating means.

According to another preferred embodiment of the present invention, there is provided an on-vehicle path guide apparatus in which path information to each area is stored in the form of path search index data in path search index data storage means, and path search index data searching means searches for a recommended path from a main road in the vicinity of a current position of an own vehicle to an area in which a destination is located by using the data.

According to another preferred embodiment of the present invention, there is provided an on-vehicle path guide apparatus in which, even while path search index data searching means is searching for a recommended path to a destination, path search control means indicates a recommended path obtained by a search to a passenger whenever necessary each time a predetermined condition is met.

According to another preferred embodiment of the present invention, there is provided an on-vehicle path guide apparatus in which, when a distance from a terminal link of a recommended path obtained by a search made by path search index data searching means to a destination is equal to or less than a predetermined distance, path search control means controls such that path search road network data searching means searches for the recommended path to the destination by using path search road network data.

According to another preferred embodiment of the present invention, there is provided an on-vehicle path guide apparatus in which path search hierarchical index data including hierarchial path information to each area is stored in path search hierarchical index data storage means, and path search hierarchical index data searching means searches for a recommended path from a main road closest to a current position of an own vehicle to a main road closest to a destination at high speed by using the path search hierarchical index data.

According to another preferred embodiment of the present invention, there is provided an on-vehicle path guide apparatus in which path search index data stored in path search index data storage means or path search hierarchical index data stored in path search hierarchical index data storage means includes, for example, data showing that a toll road should preferentially be selected, data showing that the toll road should not preferentially be selected, and data showing that a path leading to specified facilities should preferentially be selected, and in view of the priority data desired by a passenger, path search index data searching means or path search hierarchical index data searching means searches for the recommended path at high speed.

According to another preferred embodiment of the present invention, there is provided an on-vehicle path guide apparatus in which path search control means controls such that path search index data searching means searches for a recommended path by using path search index data and path search network data depending upon a direction in which an own vehicle travels from nodes at both ends of a link including a current position of the own vehicle, selects a recommended path having a lower cost value from among obtained recommended paths from the nodes at the both ends so as to avoid a U-turn as far as possible, and indicates the path to a passenger through indicating means.

According to another preferred embodiment of the present invention, there is provided an on-vehicle path guide apparatus in which data of a recommended path which has been obtained by a search is stored in recommended path storage means, path deviation detecting means detects deviation of a current position from the recommended path, and path search control means controls such that path search index data searching means searches for a path from a point where an own vehicle deviates from the recommended path to a destination or the original recommended path by using the data of the recommended path and path search index data. Even when the own vehicle deviates from the recommended path, the path to the destination or the original recommended path is provided for the passenger as far as possible.

According to another preferred embodiment of the present invention, there is provided an on-vehicle path guide apparatus in which data of a recommended path is stored in recommended path storage means, path search control means sets a point on the recommended path within a predetermined range from a current position of an own vehicle as a destination, and alternative path searching means makes a path search by setting a cost of the recommended path higher and efficiently searches for an alternative path.

According to another preferred embodiment of the present invention, there is provided an on-vehicle path guide apparatus in which data of a recommended path is stored in recommended path storage means, and by using traffic information received by traffic information receiving means, dynamic path searching means sets a point on the recommended path within a predetermined range from a current position of an own vehicle as a destination to calculate a recommended path cost in which the dynamic traffic information is reflected and search for the recommended path.

According to another preferred embodiment of the present invention, there is provided an on-vehicle path guide apparatus in which data of a recommended path is stored in recommended path storage means, path deviation detecting means detects that an own vehicle deviates from the recommended path, and a travel path after the own vehicle deviates from the recommended path and a destination are stored in deviation travel path storage means. Further, when the travel path deviates from the recommended path to the same destination the predetermined number of times or more, index data changing means changes path search index data such that the vehicle passes along the travel path, and the changed data is stored in path search index data storage means, thereby including an alternative path, for example, chosen according to a passenger's taste or frequently used to pass in the recommended path.

According to another preferred embodiment of the present invention, there is provided an on-vehicle path guide apparatus in which path search control means makes a path search from a plurality of destination representative points selected from among road network data to all links in network data, and a result of path search is stored in the path search control means. Further, the path search control means selects a destination representative point closest to a destination set by setting means, searches a result of path search for selection of the recommended path until an own vehicle approaches a point at a predetermined distance from the destination, and sequentially reads the recommended path leading to the destination representative point. Further, indicating means indicates the recommended path leading to the destination set by the setting means from a start point.

According to another preferred embodiment of the present invention, there is provided an on-vehicle path guide apparatus in which a road on road network data is divided into a plurality of groups which are geographically in close to each other. If there is a destination representative point providing completely the same optimal path in the group, the same path search index data to the destination representative point is representatively stored in path search index data storage means. If there are a plurality of destination representative points having a small difference between optimal paths in the group, a difference in optimal path data is calculated between the destination representative points. The path search index data in which one optimal path to the destination representative point is expressed by the differential data to the other optimal path is stored in the path search index data storage means. As a result, it is possible to set a memory size smaller.

According to another preferred embodiment of the present invention, there is provided an on-vehicle path guide apparatus in which one case where a destination representative point is located inside a group is distinguished from the other case where located outside the group, and path search index data about a path to the destination representative point is divided to be stored in path search index data storage means. As a result, it is possible to set a memory size smaller.

According to another preferred embodiment of the present invention, there is provided an on-vehicle path guide apparatus in which in path search index data storage means is stored higher-hierarchy level road network data for retrieving a long-distance destination point obtained by selecting many roads included in an optimal path leading to a destination representative point at a long distance from among data of the optimal path obtained by a previous search. As a result, it is possible to search for a recommended path at high speed by using the higher-hierarchy level road network data.

According to another preferred embodiment of the present invention, there is provided a path search method including the steps of searching for a recommended path from a link closest to a current position of an own vehicle to a main link closest to a destination by using network data about a road attribute and connection of a main road and path search index data serving as path information between a link and a node, and indicating the recommended path obtained by the search to a passenger. As a result, it is possible to search for the recommended path at high speed.

According to another preferred embodiment of the present invention, there is provided a path search method in which one search method of searching for a recommended path from a link closest to a current position of an own vehicle to a main link closest to a destination by using path search index data, and the other search method by using path search road network data are selectively used depending upon a distance to the destination. As a result, it is possible to efficiently search for the recommended path and indicate the path to a passenger at high speed.

According to another preferred embodiment of the present invention, there is provided a path search method in which, each time a predetermined condition is met during a search for a recommended path to a destination, a recommended path obtained during the search for the recommended path is provided for a passenger whenever necessary. As a result, it is possible to efficiently and rapidly indicate the recommended path to the passenger.

According to another preferred embodiment of the present invention, there is provided a path search method in which, when a distance from a terminal link of a recommended path to a destination is equal to or less than a predetermined distance, a search is made for the recommended path by using path search road network data.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 10 is an explanatory view showing an illustrative decision condition used in the operation of the on-vehicle path guide apparatus of FIG. 9;

FIG. 28 is an explanatory view showing an illustrative format of traffic information data;

FIG. 29 is an explanatory view showing a correspondence between the traffic information data showing, for example, traffic jam and regulation, and path search road network data;

FIG. 32 is an explanatory view showing a data structure of a deviation travel path;

DETAILED DESCRIPTION OF THE PREFERRED EMBODIMENTS

Preferred embodiments of the invention will now be described referring to the accompanying drawings.

Embodiment 1

Figure 1:
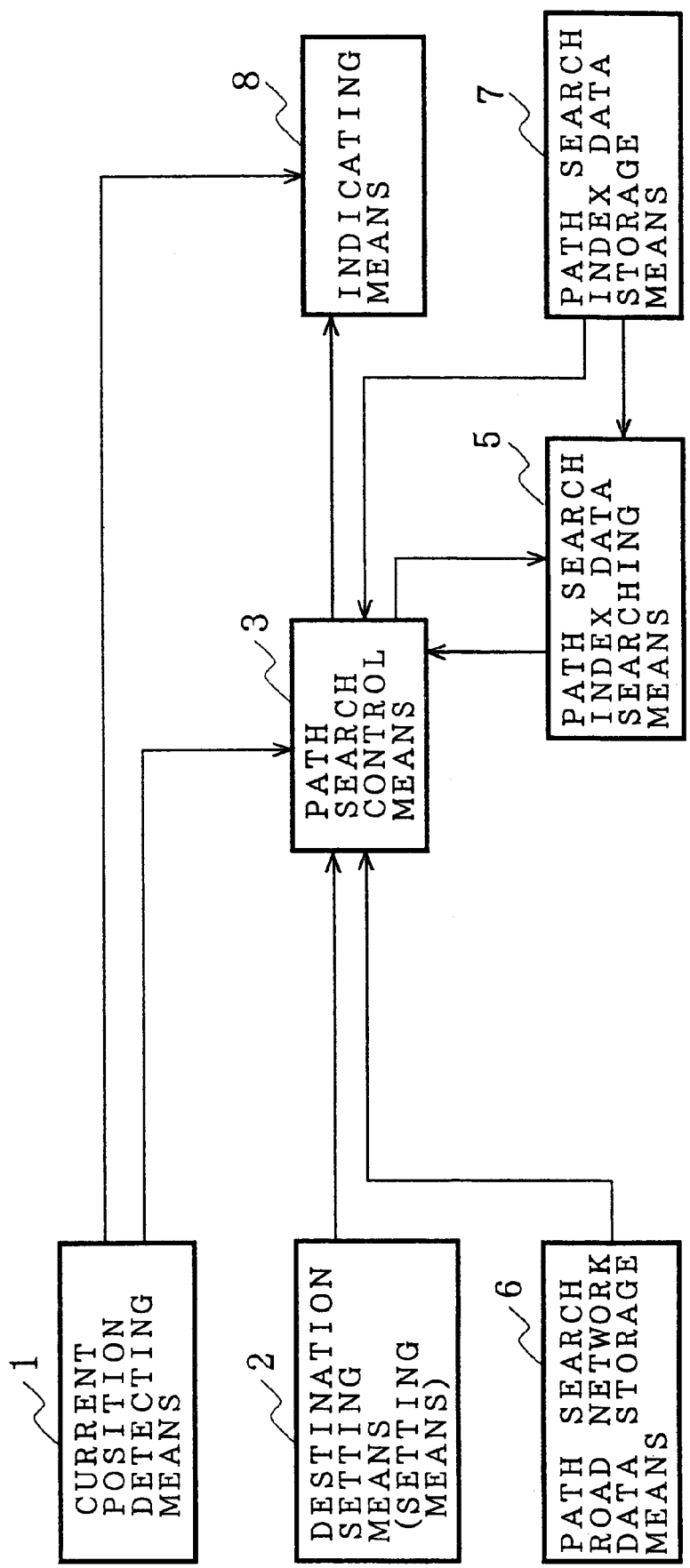
FIG. 1 is a block diagram showing an on-vehicle path guide apparatus according to the embodiment 1 of the present invention.

FIG. 1 is a block diagram showing an on-vehicle path guide apparatus according to the embodiment 1 of the present invention. In the drawing, reference numeral 1 means current position detecting means, 2 is destination setting means (setting means), 3 is path search control means, 5 is path search index data searching means, 6 is path search road network data storage means, 7 is path search index data storage means, and 8 is indicating means.

Figure 5:
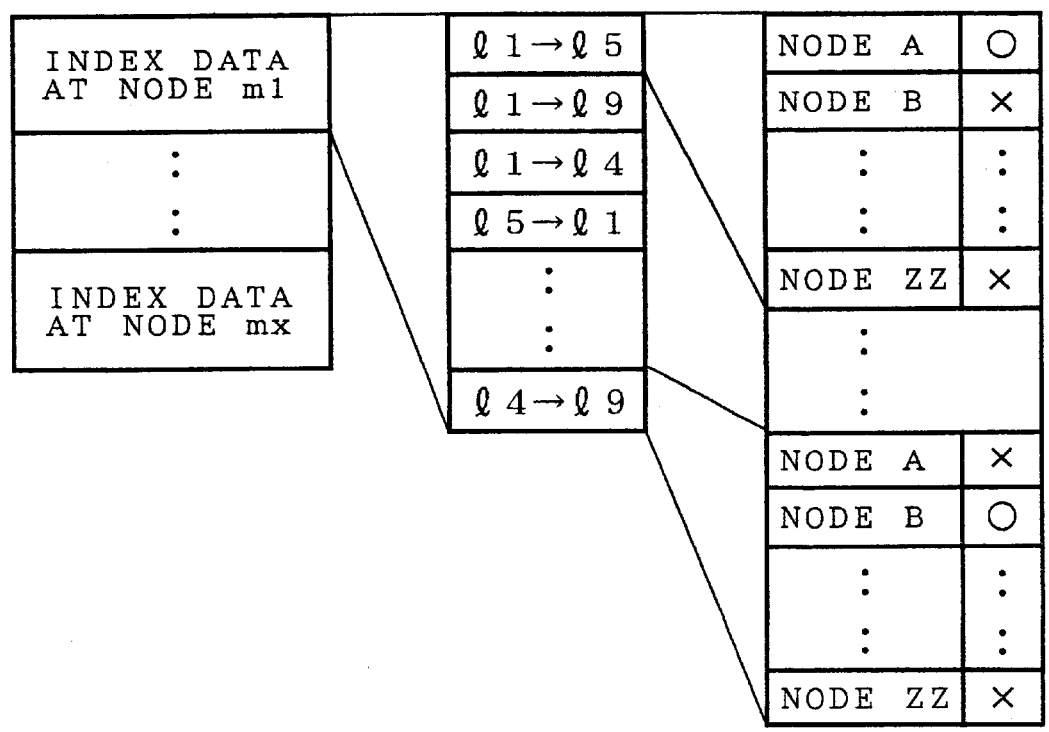
FIG. 5 is an explanatory view showing illustrative path search index data.

In the on-vehicle path guide apparatus according to the embodiment 1, a search is made for recommended paths from a current position to an intersection in the vicinity of a destination and from the intersection in the vicinity of the destination to the destination in stages and at high speed by using road network data of a main road and path search road network data serving as information about the network data which are previously stored in the path search road network data storage means 6, and path search index data (see FIG. 5, which will be described in detail) previously stored in the path search index data storage means 7. Subsequently, the obtained recommended path is provided for a passenger through the indicating means 8.

It must be noted that a structure of the current position detecting means 1 in the on-vehicle path guide apparatus shown in FIG. 1 and a current position detecting system should not be limited as long as the current position of a vehicle can be provided. For example, the present invention may employ an apparatus using a GPS receiver disclosed in JP-A 63/171377, or an apparatus to detect the position of the vehicle by using a distance sensor, a direction sensor, and map data disclosed in JP-A 63/148115.

Further, it is to be noted that a structure of the destination setting means 2 and a destination setting system should not be limited as long as information of the destination set by the passenger can be transmitted to the path search control means 3. For example, the present invention may employ a controller used by the passenger to set the destination like a control portion (setting means) 22 shown in FIG. 2.

The path search control means 3 controls the operation of the path search index data searching means 5 to search for the recommended path from the current position to the destination in stages so as to transmit the obtained recommended path to the indicating means 8.

The path search index data searching means 5 searches for a recommended path between two points set by the path search control means 3 by using the path search index data previously stored in the path search index data storage means 7. In a specific search method which will be discussed in detail, when map data shown in FIG. 4, that is, index data about the road network data corresponds to index data shown in FIG. 5, it can be understood that the vehicle may travel toward a link 15 while referring to index data of a node ml connected to a link 11 in order to move from the link 11 to a node A. Further, while referring to data of a node m2 connected to the link 15, the next connecting link may be found. This may recursively be repeated to determine a route to the destination.

Figure 2:
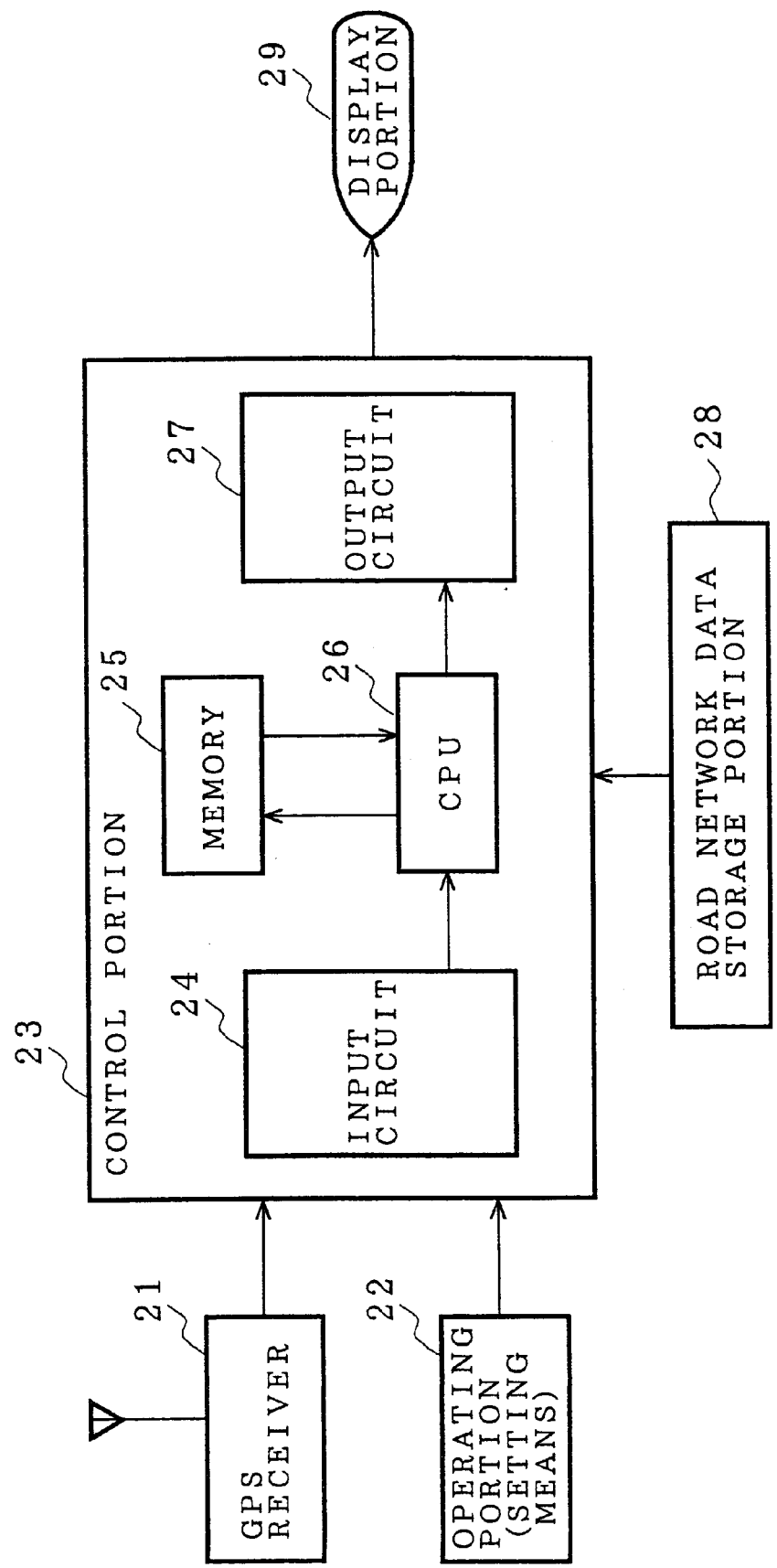
FIG. 2 is a block diagram specifically showing an illustrative configuration of the on-vehicle path guide apparatus of FIG. 1.

FIG. 2 is a block diagram showing a specific configuration of the on-vehicle path guide apparatus according to the embodiment 1 shown in FIG. 1. In the drawing, reference numeral 21 means a GPS receiver, 22 is an operating portion, 23 is a control portion, 24 is an input circuit, 25 is a memory (working memory) used at a time of, for example, calculation of the recommended path, 26 is a CPU, 27 is an output circuit, and 28 is a road network data storage portion including the path search road network data storage means 6 and the path search index data storage means 7 shown in FIG. 1. Reference numeral 29 means a display portion.

The GPS receiver 21 corresponding to the current position detecting means 1 receives radio waves emitted from GPS (Global Positioning System) satellites, and transfers received information to the control portion 23. The operating portion 22 corresponding to the destination setting means 2 includes an input equipment such as key switch, light-pen, or infrared ray touch switch, and transmits a control signal generated depending upon inputted information to the control portion 23. The memory 25 serves as a working area for operation.

The control portion 23 corresponding to a combination of the path search control means 3 and the path search index data searching means 5 is a microcomputer including the input circuit 24, the memory 25, the CPU 26, and the output circuit 27.

The road network data storage portion 28 corresponding to the path search road network data storage means 6 and the path search index data storage means 7 includes, for example, a ROM (Read-Only Memory) containing the road network data and information about the road network data. The display portion 29 corresponding to the indicating means 8 includes, for example, a CRT (Cathode Ray Tube) to display an image according to a display signal transmitted from the control portion 23.

The path search road network data storage means 6 contains the road network data of the main road and the information about the road network data. Specifically, the road network data storage portion 28 shown in FIG. 2 contains the map data shown in FIG. 4.

Figure 4:
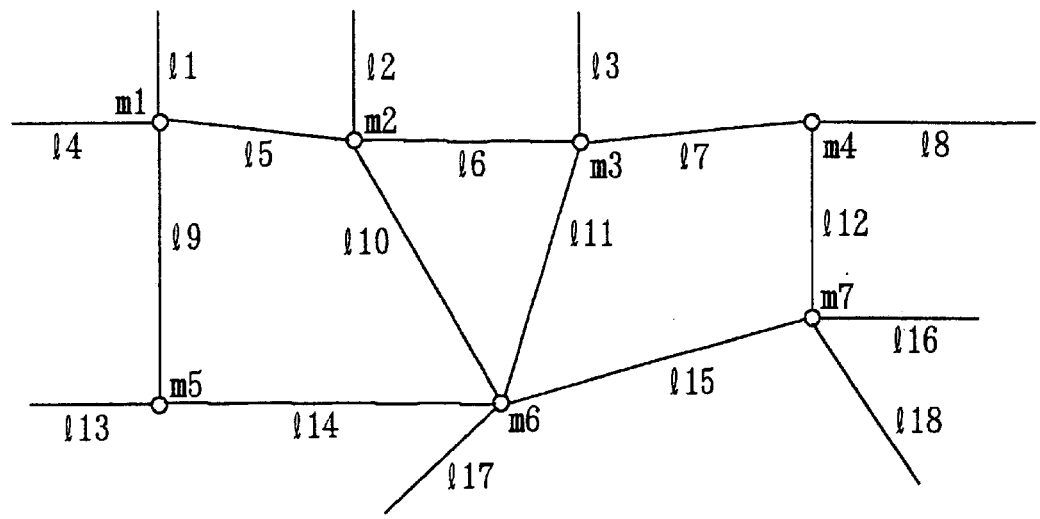
FIG. 4 is an explanatory view showing illustrative path search road network data.

In the map data shown in FIG. 4, reference mark o means a node showing an intersection, and reference numerals m1 to m7 are used for the respective nodes. Lines interconnecting the reference marks o serve as links showing roads between the nodes, and reference numerals 11 to 118 are used for the respective links.

The path search index data storage means 7 contains the path search index data from each point to each intersection. Specifically, the road network data storage portion 28 contains the index data having a hierarchical structure shown in FIG. 5. Referring to the drawing, when the vehicle passes along the link 11 connected to the node m1 and a link 15, it can be seen that a node A can be reached (which is shown by the reference mark o on the right side of the node A shown in FIG. 5), and a node B can not be reached (which is shown by the reference mark x on the right side of the node B shown in FIG. 5).

The indicating means 8 indicates to the passenger vehicle current position information transmitted from the current position detecting means 1, road network data transmitted from the path search index data storage means 7, and the recommended path obtained as a result of search by the path search control means 3. As disclosed in, for example, JP-A 1/161111, the indicating means 8 includes the display portion 29 shown in FIG. 2 and a display control circuit thereof, and has the functions of displaying a road map with enlargement or reduction, a path while overlapping it on the map, a map selection menu for input of the destination, the destination, the current position of the vehicle, a direction of the vehicle, and so forth.

A description will now be given of the operation.

Figure 3:
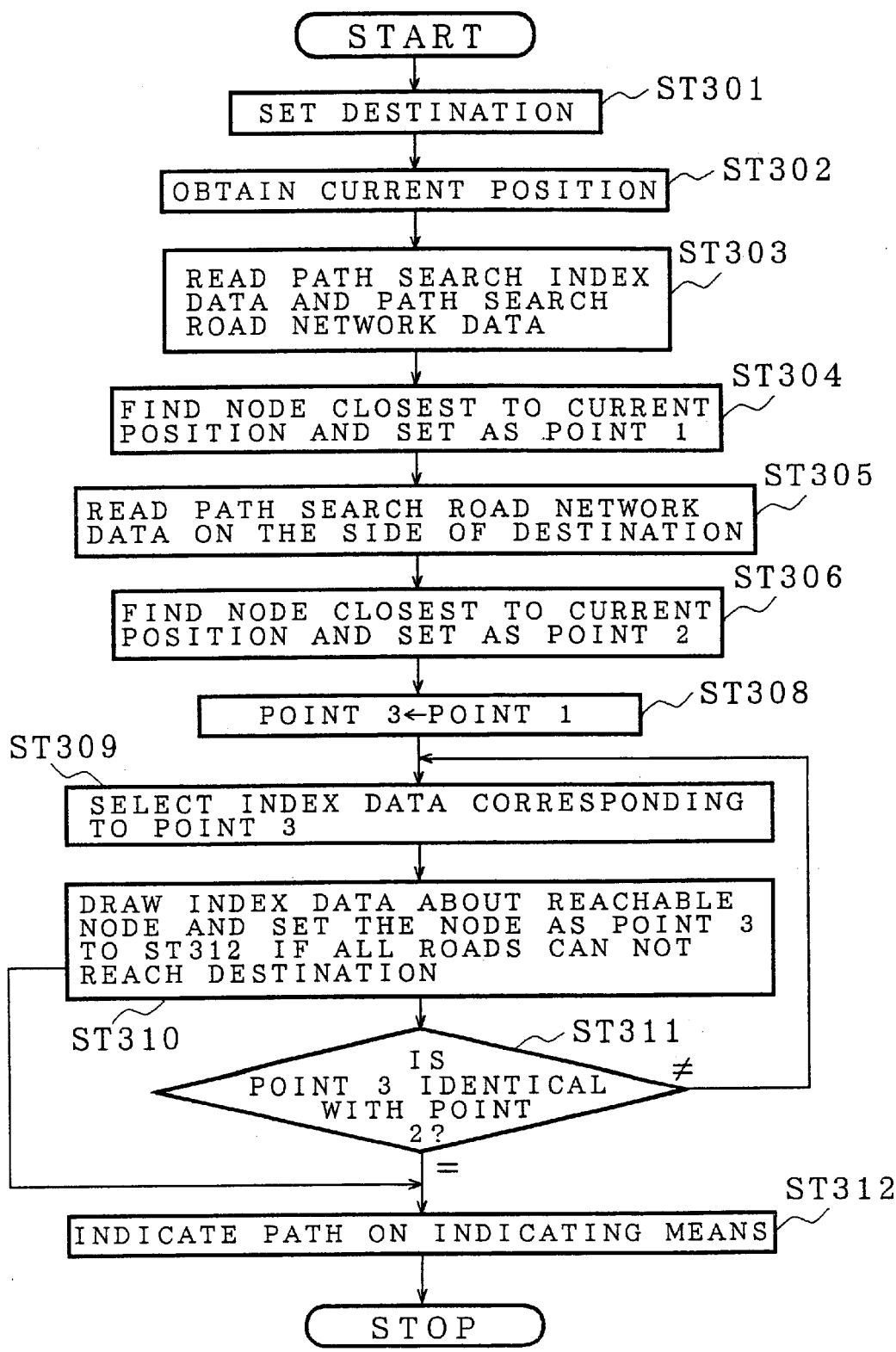
FIG. 3 is a flowchart showing the operation of the on-vehicle path guide apparatus of FIG. 1.

FIG. 3 is a flowchart illustrating the operation of the on-vehicle path guide apparatus according to the embodiment 1, showing the operation in which the path search index data and the path search road network data are used to search for the recommended path from the current position to the destination set by the passenger in stages, and the recommended path obtained by the search is indicated to the passenger.

First, the passenger uses the destination setting means 2 to set a desired destination (step ST301). Next, current position data of the vehicle is fetched from the current position detecting means 1 (step ST302).

Subsequently, path search road network data and path search index data corresponding to the current position obtained in step ST302 are read from the path search road network data storage means 6 and the path search index data storage means 7 (step ST303).

Next, a node closest to the current position fetched in step ST302 is retrieved by using the path search network data read in step ST303, and the retrieved node is set as a point 1 (step ST304).

Figure 6:
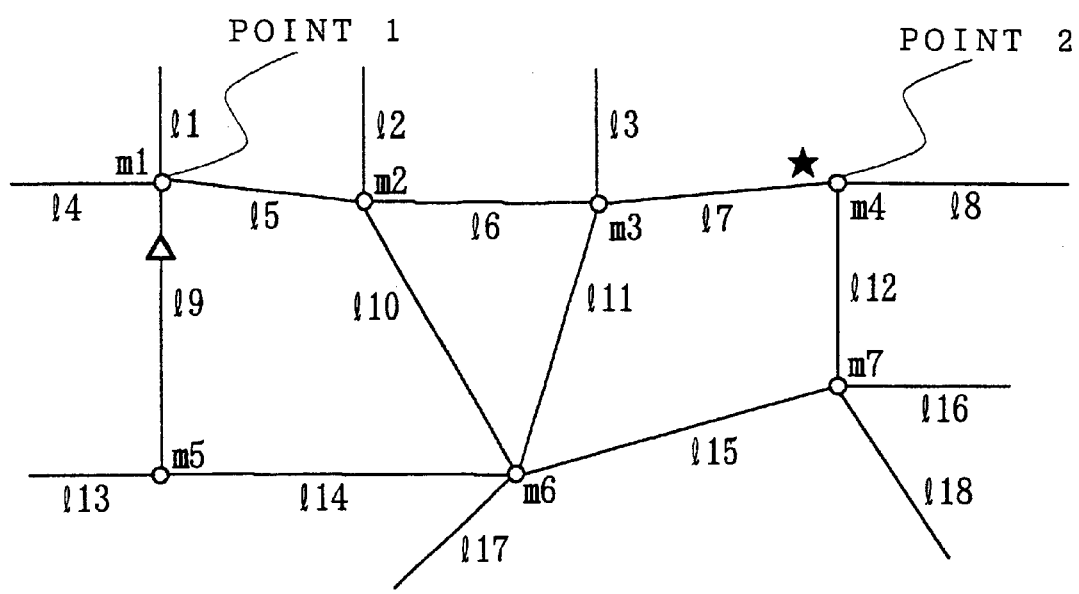
FIG. 6 is an explanatory view showing illustrative display of the path search road network data, a position of a vehicle, and a position of a destination.

FIG. 6 is a diagram showing the path search road network data fetched in step ST303. For example, when reference mark Δ means the current position obtained in step ST302, the node closest to the current position is the node m1 so that the node m1 is set as the point 1. Further, processing is carried out to read path search road network data corresponding to the destination obtained in step ST301 and specified by the passenger (step ST305).

Then, a node closest to the destination obtained in step ST301 and specified by the passenger is retrieved from among the path search road network data read and obtained from the path search road network data storage means 6 in step ST305, and the node obtained by the retrieval is set as a point 2 (step ST306). For example, when reference mark ★ means the destination obtained in step ST301 in FIG. 6, a node closest to the destination is a node m4 so that the node m4 is set as the point 2.

For the next step, a point 3 is set as a temporary point. First, as the temporary point, the point 1 set in step ST304 is set as the point 3 (step ST308). Subsequently, path search index data corresponding to the point 3 is selected from among the path search index data obtained in step ST303 (step ST309).

With respect to the path search index data obtained in step ST309, a node connected to a road which can reach the point 2 is newly set as the point 3. At the time, a link number corresponding to the reachable road is found depending upon the path search road network data obtained in step ST303, and the link number is stored (step ST310).

If it is shown as a result of step ST310 that all the roads can not reach the destination, the result means failure of search. Thus, the operation proceeds to step ST312 to indicate a message to this effect.

Further, the point 3 obtained in step ST310 is compared with the point 2 obtained in step ST306. If both points are the same point, the result is regarded as completion of search, and the operation proceeds to step ST312. If it is found that both the points are not the same point as a result of the comparison, the operation returns to step ST309 (step ST311) to repeat the processing. When the operation is completed in all steps, a result of the operation is indicated to the passenger through the indicating means 8, and the operation is ended (step ST312).

As set forth above, according to the on-vehicle path guide apparatus in the embodiment 1, it is possible to search for the recommended paths from the current position to the intersection in the vicinity of the destination and from the intersection in the vicinity of the destination to the destination in stages and at high speed by using the road network data of the main road and the path search road network data serving as the information about the road network data and the path search index data, and provide the obtained recommended paths for the passenger.

Embodiment 2

Figure 7:
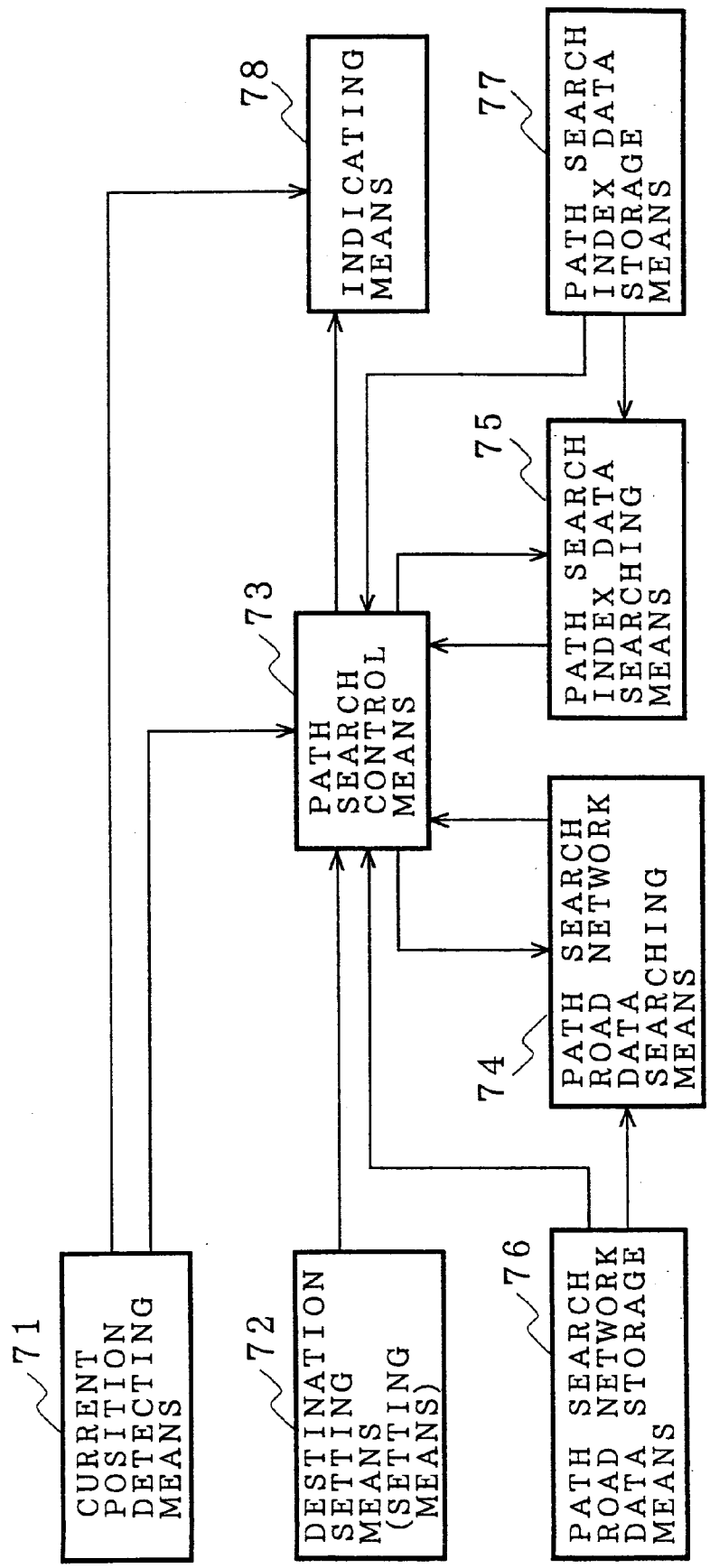
FIG. 7 is a block diagram showing an on-vehicle path guide apparatus according to the embodiment 2 of the present invention.

FIG. 7 is a block diagram showing an on-vehicle path guide apparatus according to the embodiment 2 of the present invention. In the drawing, reference numeral 71 means current position detecting means, 72 is destination setting means (setting means), 73 is path search control means, and 74 is path search road network data searching means for searching an optimal recommended-path having the shortest distance traveled or having the shortest time required to travel between two points set by the path search control means. Reference numeral 75 means path search index data searching means, 76 is path search road network data storage means, 77 is path search index data storage means, and 78 is indicating means.

In the on-vehicle path guide apparatus according to the embodiment 2 shown in FIG. 7, the path search control means 73 controls the operations of the path search road network data searching means 74 and the path search index data searching means 75 to search for a recommended path from a current position of an own vehicle to a destination set by a passenger through the destination setting means 72 in stages so as to transmit the obtained recommended path to the indicating means 78.

In a structure and the operation of the path search road network data searching means 74 disclosed in, for example, JP-A 2/224200, path search road network data stored in the path search road network data storage means 74 is used to search for the optimal recommended-path having the shortest distance traveled or having the shortest time required to travel between the two points set by the path search control means 73.

In the on-vehicle path guide apparatus according to the embodiment 2, path search index data in the path search index data storage means 77 and path search road network data in the path search road network data storage means 76 are used to find a distance traveled from the current position to an optional intersection in the vicinity of the destination, and search for a recommended path to the destination at high speed while changing a search method according to the distance traveled so as to provide the obtained recommended path for the passenger through the indicating means 78.

A description will now be given of the operation.

Figure 8:
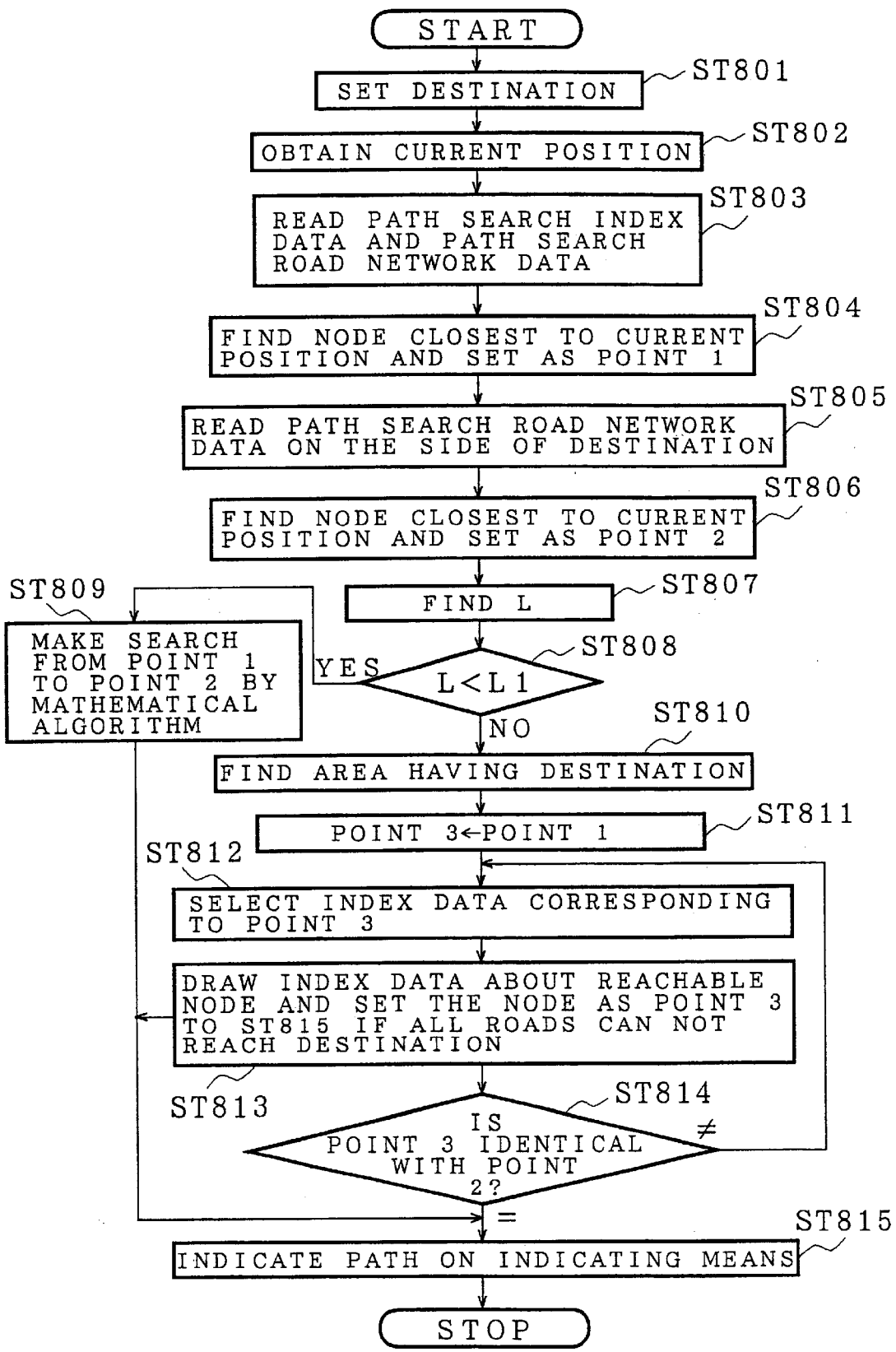
FIG. 8 is a flowchart showing the operation of the on-vehicle path guide apparatus of FIG. 7.

FIG. 8 is a flowchart showing the operation of the on-vehicle path guide apparatus according to the embodiment 2.

First, the passenger uses the destination setting means 72 to set a desired destination (step ST801). Next, current position data of a vehicle is obtained through the current position detecting means 71 (step ST802). Subsequently, path search road network data and path search index data corresponding to the current position obtained in step ST802 are read from the path search road network data storage means 76 and the path search index data storage means 77 (step ST803).

Next, a node closest to the current position obtained in step ST802 is retrieved by using the path search network data inputted in step ST803, and the node obtained by retrieval is set as a point 1 (step ST804). If the path search road network data fetched in step ST803 is, for example, map data shown in FIG. 6, and reference mark Δ means the current position fetched in step ST802, the node closest to the current position is a node m1 so that the node m1 is set as the point 1.

Further, path search road network data corresponding to the destination specified by the passenger in step ST801 is read from the path search road network data storage means 76 (step ST805). Then, a node closest to the destination obtained in step ST801 and desired by the passenger is retrieved from the path search road network data read in step ST805, and the retrieved node is set as a point 2 (step ST806). For example, when reference mark ★ means the destination fetched in step ST801, the node closest to the destination is a node m4 so that the node m4 is set as the point 2.

For the next step, a distance in a straight line between the destination obtained in step ST801 and the current position obtained in step ST802 is calculated to set a result of calculation in a variable L (step ST807). For example, when the current position fetched in step ST802 is (X1, Y1), and the destination set in step ST801 is (X2, Y2), the distance L in the straight line between the current position and the destination can be found by the following expression:

$$L = \sqrt{(X1 - X2)^2 + (Y1 - Y2)^2}$$

Then, it is decided whether or not the distance L in the straight line is less than a predetermined distance L1 of, for example, 3 Km. If the result is YES, the operation proceeds to step ST809. If the result is NO, the operation proceeds to step ST810 (step ST808).

When the result of decision in step ST808 is YES, a path search is made by using the path search network data to find a path from the point 1 to the point 2. A search method may employ a known mathematical algorithm such as Dijkstra's algorithm. After the completion of step ST809, the operation proceeds to step ST815 (step ST809).

If the result of decision in step ST808 is NO, processing is carried out to find an area in which the destination obtained in step ST801 is located. The area may include an area obtained depending upon division according to an administrative section such as prefecture or town, or an area divided according to a mesh-type structure to have a specified size and a unique area number (step ST810).

For the next step, a point 3 is set as a temporary point. First, the point 1 is set as the temporary point (step ST811). Subsequently, path search index data corresponding to the point 3 is selected from among the path search index data read in step ST803 (step ST812). With respect to the path search index data obtained in step ST812, a node connected to a road which can reach the area found in step ST810 is newly set as the point 3. At the time, a link number corresponding to the reachable road is found depending upon the path search road network data read in step ST803, and the link number is stored (step ST813).

If it is shown as a result of step ST813 that all the roads can not reach the destination, the result is regarded as failure of search, and the operation proceeds to step ST815. Further, the point 3 found in step ST813 is compared with the point 2 found in step ST806. If both points are the same point, the result is regarded as completion of search, and the operation proceeds to step ST815. If not the same point, the operation proceeds to step ST812.

When the operation is completed in all steps, a result of the operation is provided for the passenger through the indicating means 78, and the operation is ended (step ST815).

As set forth above, according to the on-vehicle path guide apparatus in the embodiment 2, it is possible to find the distance traveled from the current position to the optional intersection in the vicinity of the destination by using the path search index data and the path search road network data, and search for the recommended path to the destination at high speed while changing the search method according to the distance traveled so as to provide the obtained recommended path for the passenger through the indicating means 78.

Embodiment 3

An on-vehicle path guide apparatus according to the embodiment 3 has the same structure as that of the on-vehicle path guide apparatus according to the embodiment 1 shown in FIGS. 1 to 6, and descriptions thereof are omitted to avoid unnecessary repetition.

In the on-vehicle path guide apparatus according to the embodiment 3, while searching for a recommended path from a current position to a destination by using path search index data and path search road network data, a decision of the recommended path obtained by a search is made depending upon a predetermined decision condition, and the recommended path which matches the decision condition is indicated to a passenger through indicating means 8 whenever necessary for a guide to the recommended path.

A description will now be given of the operation.

Figure 9:
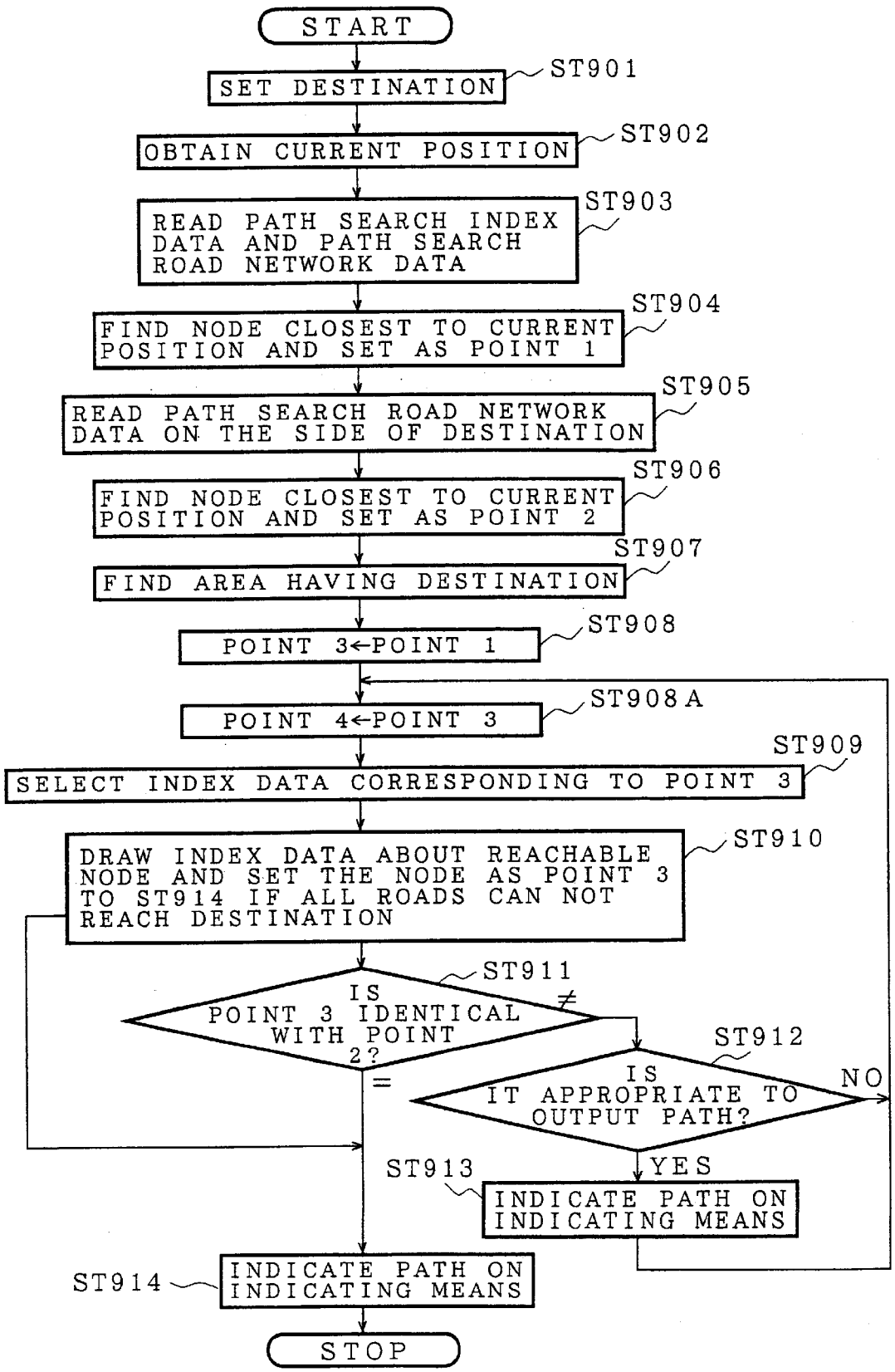
FIG. 9 is a flowchart showing the operation of an on-vehicle path guide apparatus according to the embodiment 3 of the present invention.

FIG. 9 is a flowchart showing the operation of the on-vehicle path guide apparatus according to the embodiment 3.

First, the passenger uses destination setting means 2 to set a desired destination (step ST901). Next, current position information of a vehicle is inputted through current position detecting means 1 (step ST902).

Subsequently, path search road network data and path search index data corresponding to the current position obtained in step ST902 are read from the path search road network data storage means 6 and the path search index data storage means 7 (step ST903).

Next, a node closest to the current position obtained in step ST902 is retrieved by using the path search network data read in step ST903, and the retrieved node is set as a point 1 (step ST904). For example, if the path search road network data obtained in step ST903 is map data shown in FIG. 6, and reference mark Δ means the current position fetched in step ST902, the node closest to the current position is a node m1 so that the node m1 is set as the point 1.

Further, path search road network data corresponding to the destination specified by the passenger in step ST901 is read from path search road network data storage means 6 (step ST905).

Then, a node closest to the destination obtained in step ST901 and desired by the passenger is retrieved from among the path search road network data read in step ST905, and the retrieved node is set as a point 2 (step ST906). For example, when reference mark ★ in FIG. 6 means the destination fetched in step ST901, the node closest to the destination is a node m4 so that the node m4 is set as the point 2.

For the next step, processing is carried out to find an area in which the destination obtained in step ST901 is located. The area may include an area obtained depending upon division according to an administrative section such as prefecture or town, or an area divided according to a mesh-type structure to have a specified size and a unique area number (step ST907). Next, a point 3 is set as a temporary point. First, the point 1 is set as the temporary point (step ST908).

Subsequently, a point 4 is set as the temporary point. The same point as the point 3 is set at the temporary point (step ST908A).

Further, path search index data corresponding to the point 3 is selected from among the path search index data read in step ST903 (step ST909). With respect to the path search index data selected in step ST909, a node connected to a road which can reach the area found in step ST908 is newly set as the point 3. At the time, information corresponding to the reachable road such as a link number, the type of road, the type of link are found depending upon the path search road network data obtained in step ST903, and the link number is stored. If it is shown in step ST910 that all the roads can not reach the destination, the result is regarded as failure of search, and the operation proceeds to step ST914 (step ST910).

Next, the point 3 obtained in step ST910 is compared with the point 2 obtained in step ST906. If both points are the same point, the result is regarded as completion of search, and the operation proceeds to step ST914. If not the same point, the operation proceeds to step ST912 (step ST911). Further, with respect to a path from the point 1 to the point 3, it is decided whether or not output of the path is appropriate. FIG. 10 shows conditions used for the decision. Specifically, in one illustrative decision method, the type of road of a path to the point 4 is compared with the type of road of a path from the point 4 to the point 3. If the types of road are different, it is decided that output of the path is appropriate. If output of the path is appropriate, the operation proceeds to step ST913. If not appropriate, the operation proceeds to step ST908A (step ST912).

Figure 40:
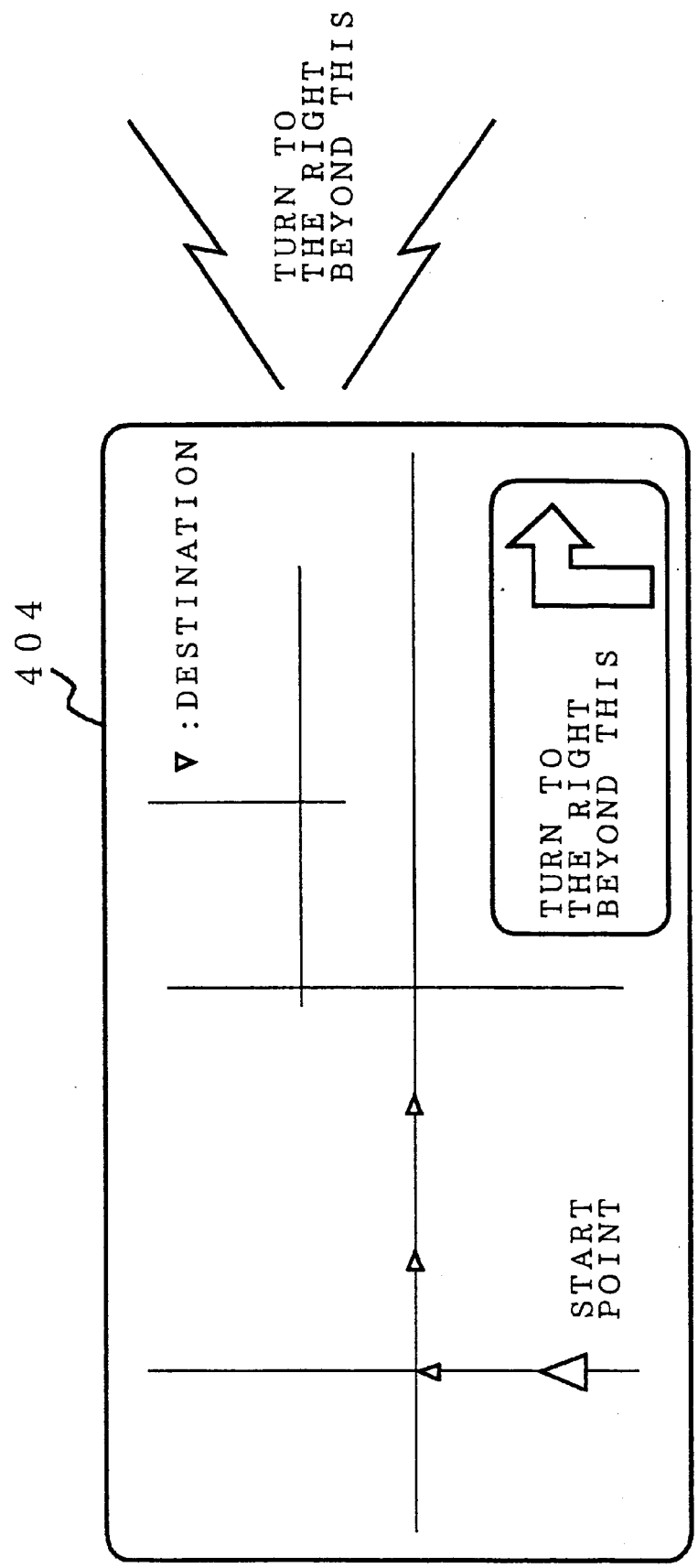
FIG. 40 is an explanatory view showing illustrative display of indicating means.
Figure 41:
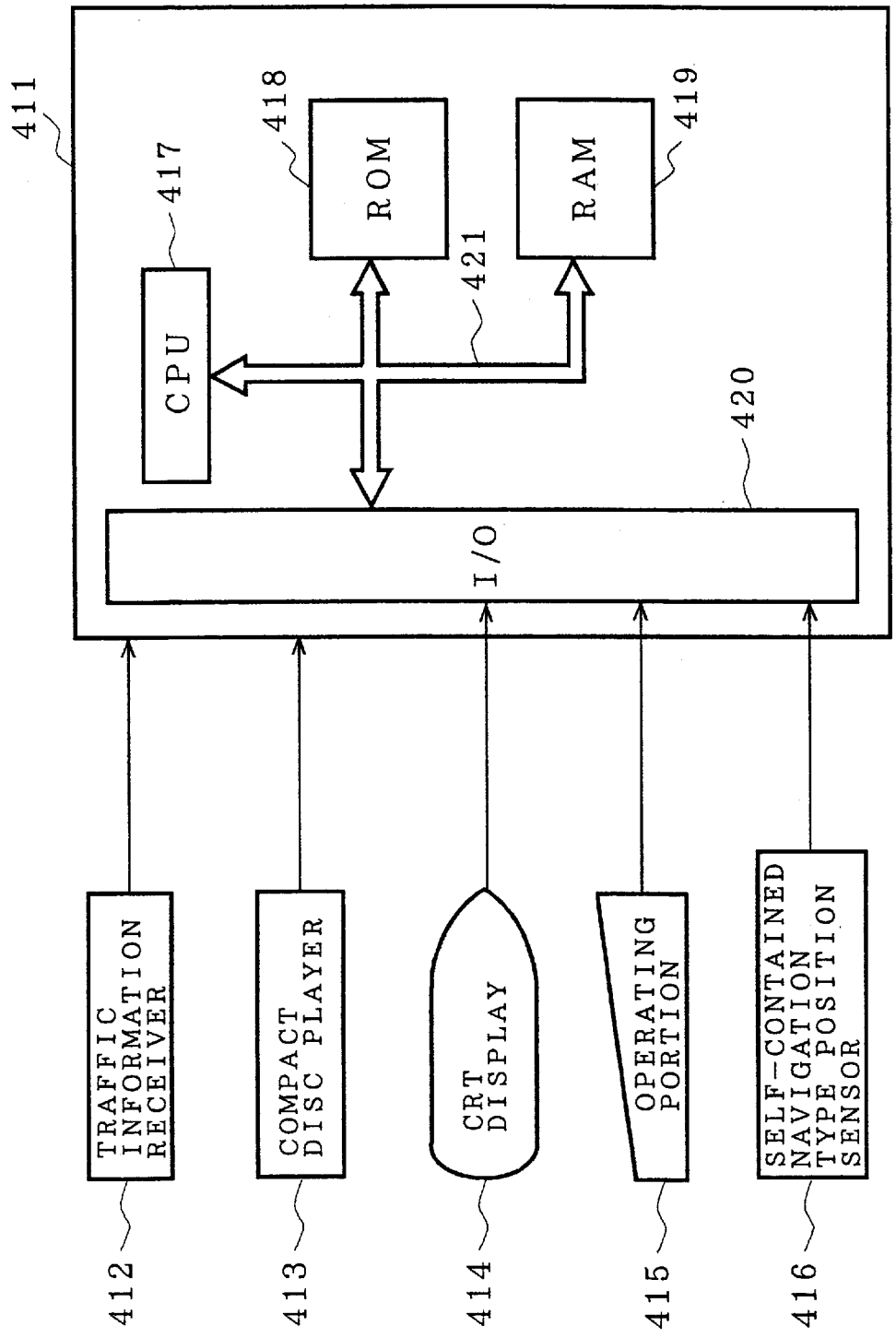
FIG. 41 is a block diagram showing a conventional on-vehicle path guide apparatus.

With respect to the path outputted in step ST912, a direction of travel is indicated to the passenger through the indicating means 8. An indicate method may include various methods of, for example, displaying on displaying means a message: "Turn to the right beyond this," providing the massage for the passenger as a voice message through a speaker, displaying on the indicating means 8 an arrow showing the direction of travel, displaying an enlarged diagram of an intersection, and indicating the message to the passenger by a combination of the indicating means 8, the speaker, and so forth. FIG. 40 shows illustrative indication of the indicating means 8 (step ST913).

When the operation is completed in all steps, a result of the operation is outputted on the indicating means 8, and the operation is ended (step ST914). It is to be noted that the embodiment may be applied in combination with the on-vehicle path guide apparatus according to the embodiments 1 and 2.

As set forth above, according to the on-vehicle path guide apparatus in the embodiment 3, it is possible to make the decision of the recommended path obtained by the search depending upon the predetermined decision condition while searching for the recommended path from the current position to the destination, and indicate the recommended path which matches the decision condition to the passenger through the indicating means 8 whenever necessary, resulting in an efficient guide to the recommended path.

Embodiment 4

FIG. 7 is a block diagram showing an on-vehicle path guide apparatus according to the embodiment 4, and is the same block diagram as that showing the on-vehicle path guide apparatus according to the embodiment 2. Thus, the same reference numerals are used for component parts identical with those in the embodiment 2 shown in FIG. 7, and descriptions thereof are omitted.

In the on-vehicle path guide apparatus according to the embodiment 4, path search index data is used to search for a recommended path to an area in the vicinity of a destination, and path search road network data is used to search for a recommended path to the destination according to a distance from the area to the destination. That is, a search is made for the recommended path at high speed while changing a method of searching for the recommended path according to the distance from a position of an own vehicle to the destination.

A description will now be given of the operation.

Figure 11:
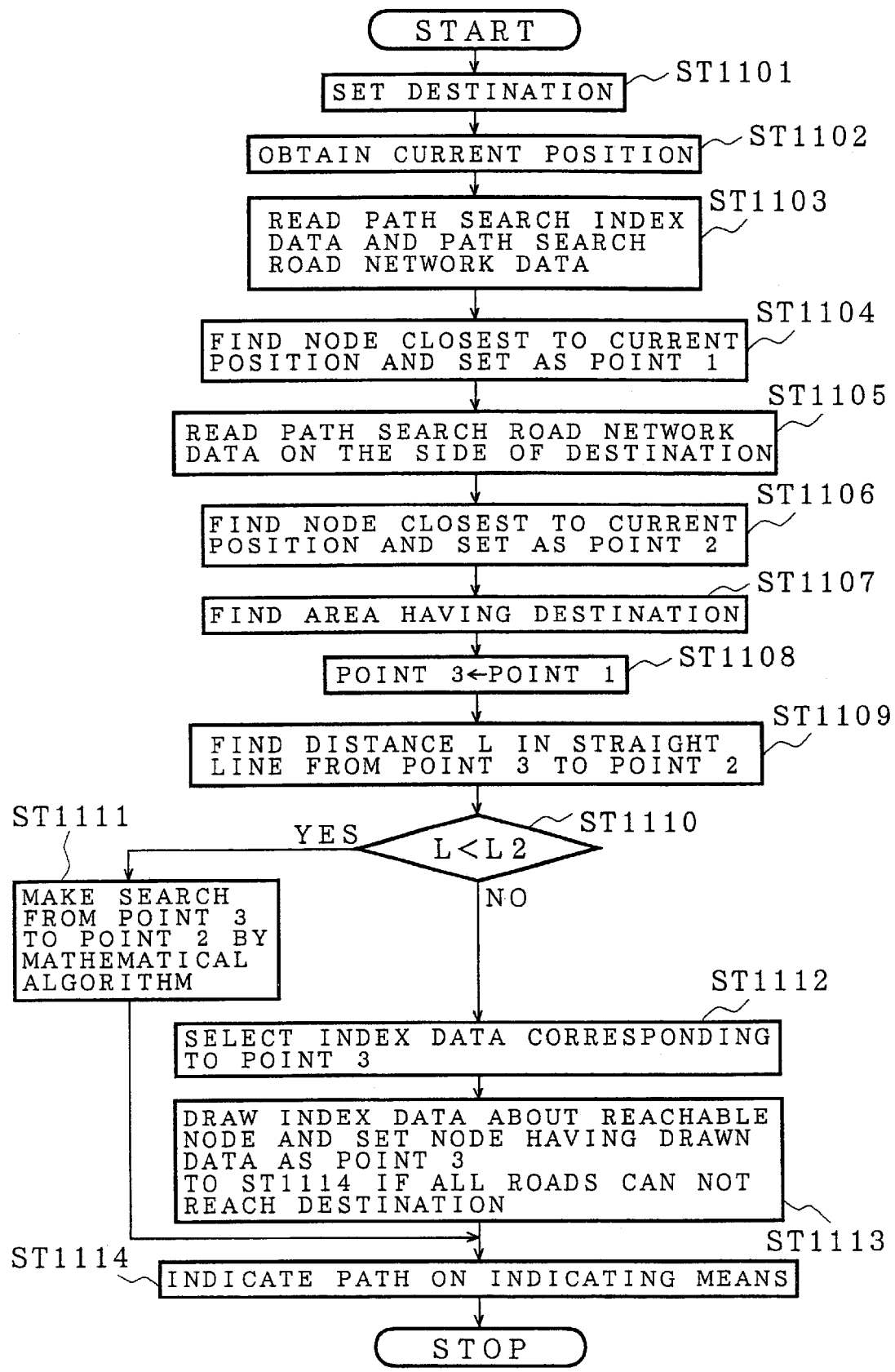
FIG. 11 is a flowchart showing the operation of an on-vehicle path guide apparatus according to the embodiment 4 of the present invention.

FIG. 11 is a flowchart showing the operation of the on-vehicle path guide apparatus according to the embodiment 4.

First, the passenger uses destination setting means 72 to set a desired destination (step ST1101). Next, current position information of the vehicle is obtained through current position detecting means 71 (step ST1102). Subsequently, path search road network data and path search index data corresponding to the current position obtained in step ST1102 are read from path search road network data storage means 76 and path search index data storage means 77 (step ST1103).

Next, a node closest to the vehicle current position obtained in step ST1102 is retrieved by using the path search network data obtained in step ST1103, and the retrieved node is set as a point 1 (step ST1104).

For example, if a map shown in FIG. 6 is the path search road network data fetched in step ST1103, and reference mark Δ means the current position obtained in step ST1102, the node closest to the current position is a node m1 so that the node m1 is set as the point 1.

Further, path search road network data corresponding to the destination obtained in step ST1101 and desired by the passenger is read from the path search road network data storage means 76 (step ST1105). Then, a node closest to the destination obtained in step ST1101 and desired by the passenger is retrieved from among the path search road network data read in step ST1105, and the retrieved node is set as a point 2 (step ST1106). For example, when reference mark ★ shown in FIG. 6 means the destination obtained in step ST1101, the node closest to the destination is a node m4 so that the node m4 is set as the point 2.

For the next step, processing is carried out to find an area in which the destination obtained in step ST1101 is located. The area may include an area obtained depending upon division according to an administrative section such as prefecture or town, or an area divided according to a mesh-type structure to have a specified size and a unique area number (step ST1107). Next, a point 3 is set as a temporary point. First, the point 1 is set as the point 3 (step ST1108). Subsequently, a distance in a straight line between the destination obtained in step ST1101 and the current position obtained in step ST1102 is calculated to set the result of calculation to a variable L.

For example, when the current position obtained in step ST1102 is (X1, Y1), and the destination set in step ST1101 is (X2, Y2), the distance L in the straight line between the current position and the destination can be found by the following expression (step ST1109):

$$L = \sqrt{(X1 - X2)^2 + (Y1 - Y2)^2}$$

Then, it is decided whether or not the distance L in the straight line is less than a predetermined distance L2 of, for example, 3 Km. If less than L2, that is, the result of decision is YES, the operation proceeds to step ST1111. If equal to or more than 3 Km, that is, the result of decision is NO, the operation proceeds to step ST1112 (step ST1110).

When the result in step ST1110 is YES, a path search is made by using the path search network data to find a path from the point 3 to the point 2. A search method may employ a known mathematical algorithm such as Dijkstra's algorithm. After the completion of step ST1111, the operation proceeds to step ST1114 (step ST1111).

If the result of decision in step ST1110 is NO, path search index data corresponding to the point 3 is selected from among the path search index data read in step ST1103 (step ST1112).

With respect to the path search index data obtained in step ST1112, a node connected to a road which can reach the area found in step ST1107 is newly set as the point 3. At the time, a link number corresponding to the reachable road is found depending upon the path search road network data read in step ST1103, and the link number is stored. Thereafter, the operation proceeds to step ST1109. If it is shown in the step that all the roads can not reach the destination, the result is regarded as failure of search, and the operation proceeds to step ST1114 (step ST1113).

When the operation is completed in all steps, a result of the operation is outputted to the indicating means 78, and the operation is ended (step ST1114). It is to be noted that the on-vehicle path guide apparatus according to the embodiment 4 may be applied in combination with the on-vehicle path guide apparatus according to the embodiments 1 and 2.

As set forth above, according to the on-vehicle path guide apparatus in the embodiment 4, it is possible to find the recommended path from the current position to the optional node in the area in which the destination is located by using the path search index data and the path search road network data, and subsequently search for the recommended path to the destination while changing the method of searching for the recommended path according to the distance to the destination. It is thereby possible to search for the recommended path at high speed and provide the obtained recommended path for the passenger through the indicating means.

Embodiment 5

Figure 12:
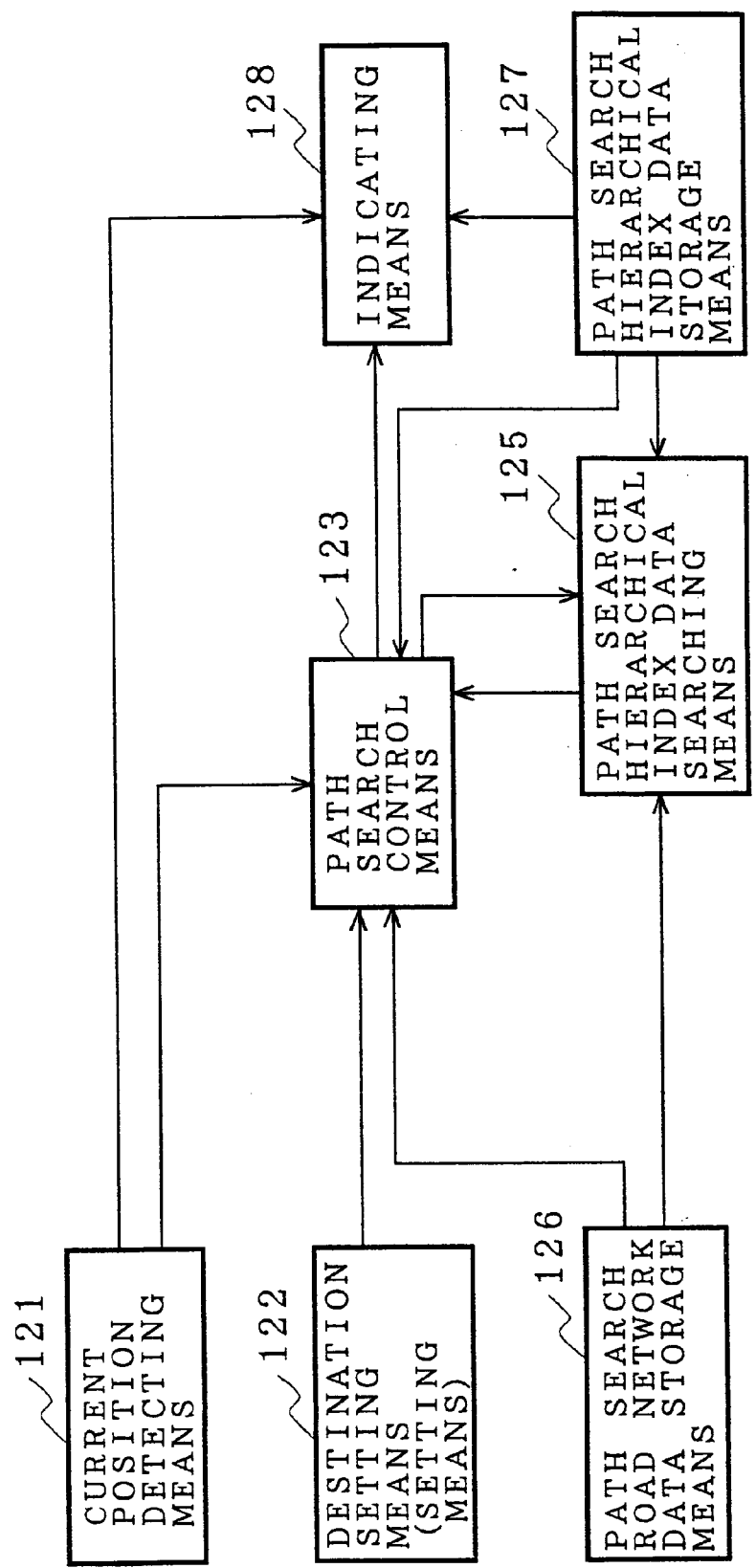
FIG. 12 is a block diagram showing an on-vehicle path guide apparatus according to the embodiment 5 of the present invention.

FIG. 12 is a block diagram showing an on-vehicle path guide apparatus according to the embodiment 5 of the present invention. In the drawing, reference numeral 125 means path search hierarchical index data searching means, and 127 is path search hierarchical index data storage means. Further, reference numeral 121 means current position detecting means, 122 is destination setting means (setting means), 123 is path search control means, 126 is path search road network data storage means, and 128 is indicating means. These component parts have the same functions as those of the current position detecting means 1, the destination setting means 2, the path search control means 3, and indicating means 8, and descriptions thereof are omitted.

Figure 14:
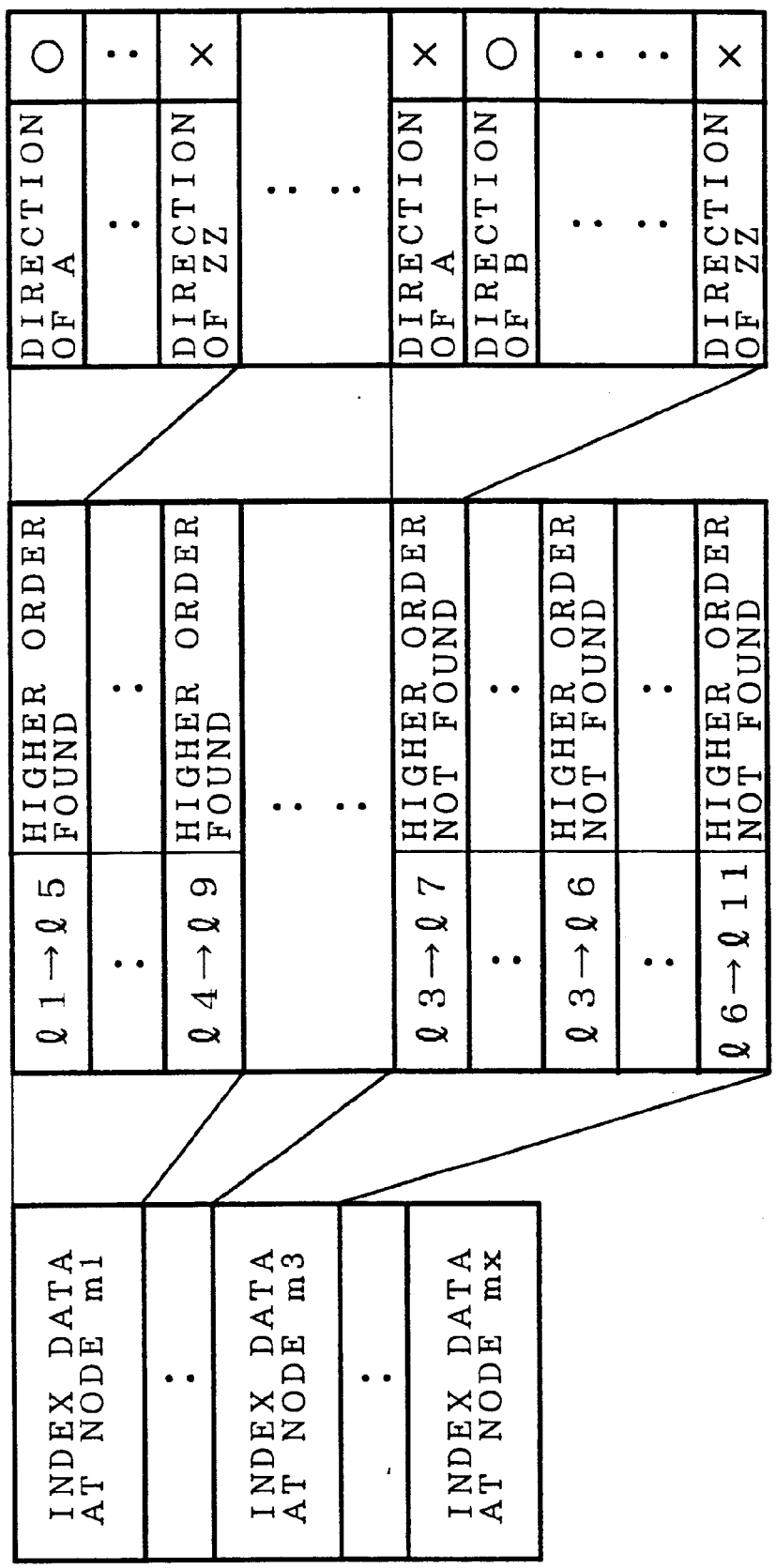
FIG. 14 is an explanatory view showing illustrative lower-hierarchy path search index data stored in path search index data storage means in the on-vehicle path guide apparatus of FIG. 12.

The path search hierarchical index data searching means 125 searches for a recommended path between two points set by the path search control means 123 by using path search hierarchical index data stored in the path search hierarchical index data storage means 127. Specifically, in one search method, when data shown in FIG. 14 is index data of map data shown in FIG. 4, it can be understood that a vehicle may travel toward a link 15 while referring to index data of a node m1 connected to a link 11 in order to move from the link 11 in a direction of A. Further, data of a node m2 connected to the link 15 is referred to find the next connecting link. This is recursively repeated to determine a route to the destination. At the time, if higher order index data is found at each node of path search hierarchical index data which will be described infra, the operation moves up to the higher order index data to continue the search.

Figure 13:
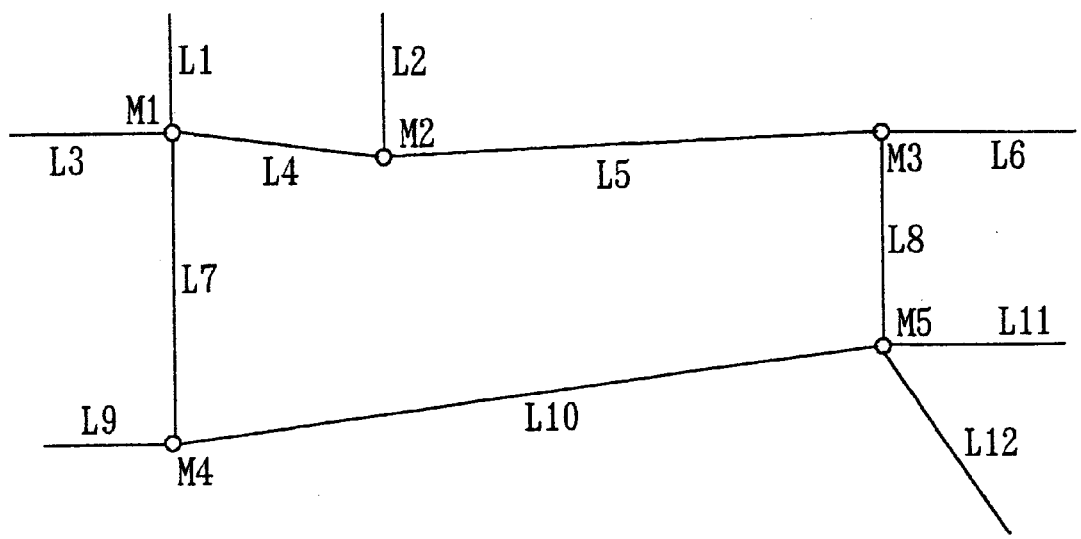
FIG. 13 is an explanatory view showing illustrative path search road network data stored in search road network data storage means in the on-vehicle path guide apparatus of FIG. 12.

The path search road network data storage means 126 stores road data of a main road and information about the road data in the road network data storage portion 28 shown in FIG. 2, which contains the map data shown in FIG. 4 and map data shown in FIG. 13 drawn by extracting principal roads from FIG. 4. FIG. 13 is positioned as higher order network data of the map data shown in FIG. 4.

In FIG. 13, reference mark ○ means a node showing an intersection, and reference numerals M1 to M5 are used for the respective nodes. Lines interconnecting reference marks ○ mean links showing roads between the nodes, and reference numerals L1 to L12 are used for the respective links. Further, the links include the links in FIG. 4. For example, the link L5 in the map data shown in FIG. 13 includes the link 16 and the link 17 in FIG. 4.

Figure 15:
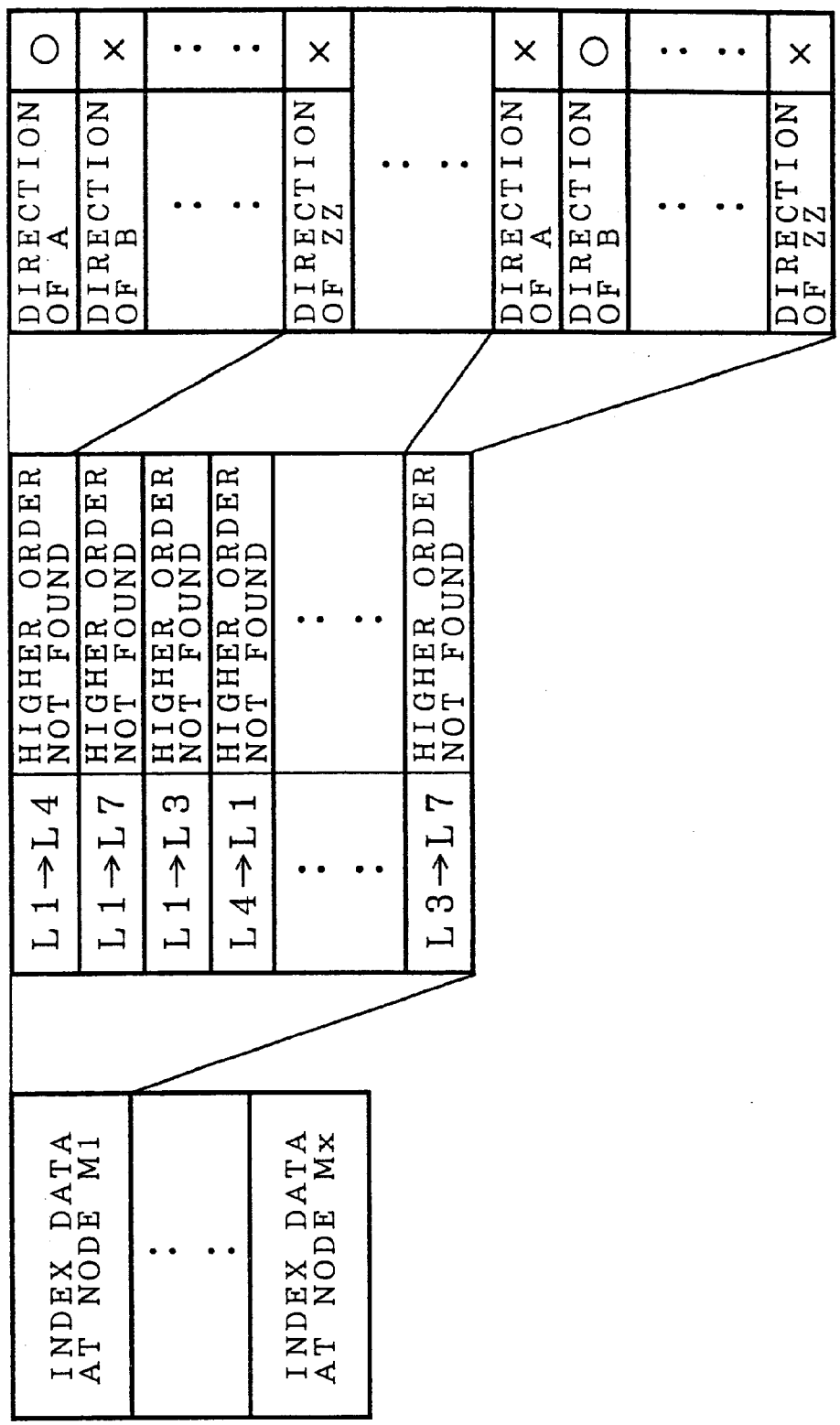
FIG. 15 is an explanatory view showing illustrative higher-hierarchy path search index data stored in path search index data storage means in the on-vehicle path guide apparatus of FIG. 12.

Instead of the road network data storage portion 28 in FIG. 2, the path search hierarchical index data storage means 127 contains path search hierarchical index data from each point to each intersection, including data as shown in FIG. 14 and data as shown in FIG. 15. FIG. 15 is positioned as higher order index data of FIG. 14.

The data in FIG. 14 is index data corresponding to the data shown in FIG. 4, and includes information about whether or not an inflow link and an outflow link at each node are negotiable roads to each area. Further, it must be noted that information about the presence or absence of higher order index data is defined.

In the on-vehicle path guide apparatus according to the embodiment 5, the path search hierarchical index data stored in the path search hierarchical index data storage means 127 and the path search road network data stored in the path search road network data storage means 126 are used to search for a recommended path from a current position of an own vehicle to a destination set by the passenger in stages, and the recommended path obtained by the search is rapidly indicated through the indicating means 128.

A description will now be given of the operation.

In FIG. 12, the path search hierarchical index data stored in the path search hierarchical index data storage means 127 and the path search road network data stored in the path search road network data storage means 126 are used to search for the recommended path from the current position of the own vehicle to the destination set by the passenger in stages, and the recommended path obtained by the search is indicated to the passenger. The operation will be described with reference to the flowchart shown in FIG. 3.

First, the passenger uses the destination setting means 122 to set a desired destination (step ST301).

Next, current position data of the vehicle is obtained through the current position detecting means 121 (step ST302).

Subsequently, path search road network data and path search index data corresponding to the current position obtained in step ST302 are read from the path search road network data storage means 126 and the path search hierarchical index data storage means 127 (step ST303).

Next, a node closest to the current position fetched in step ST302 is retrieved by using the path search network data read in step ST303, and the retrieved node is set as a point 1 (step ST304).

For example, when map data shown in FIG. 6 is the path search road network data fetched in step ST303, and reference mark Δ means the current position fetched in step ST302, the node closest to the current position is the node m1 so that the node m1 is set as the point 1. Further, processing is carried out to read path search road network data corresponding to the destination obtained in step ST301 and desired by the passenger (step ST305).

Then, a node closest to the destination fetched in step ST301 and specified by the passenger is retrieved from among the path search road network data read in step ST305, and the node obtained by the retrieval is set as a point 2 (step ST306). For example, when reference mark ★ means the destination obtained in step ST301, the node closest to the destination is a node m4 so that the node m4 is set as the point 2.

For the next step, processing is carried out to find an area in which the destination obtained in step ST301 is located. The area may include an area obtained depending upon division according to an administrative section such as prefecture or town, or an area divided according to a mesh-type structure to have a specified size and a unique area number. Next, a point 3 is set as a temporary point. First, the point 1 is set as the point 3 (step ST308). Subsequently, path search index data corresponding to the point 3 is selected from among the path search index data read in step ST303 (step ST309).

With respect to the path search hierarchical index data obtained in step ST309, a node connected to a road which can reach the area found in step ST308 is newly set as the point 3. At the time, information of a link corresponding to the reachable road is found depending upon the path search road network data read in step ST303, and a link number corresponding thereto is stored. Further, if higher order index data is found in hierarchical index data at a node of the point 3 as shown by "higher order found" shown in the data in FIG. 14, higher order index data is read to continue the search (step ST310).

If it is shown in step ST310 that all the roads can not reach the destination, lower order index data is read to continue the search. If no lower order index data can be found, the result is regarded as failure of search, and the operation proceeds to step ST312. Further, the point 3 obtained in step ST310 is compared with the point 2 obtained in step ST306. If both points are the same point, the result is regarded as completion of search, and the operation proceeds to step ST312. If not the same point, the operation proceeds to step ST309 (step ST311).

When the operation is completed in all steps, a result of the operation is indicated to the passenger through the indicating means 128, and the operation is ended (step ST312).

As set forth above, according to the on-vehicle path guide apparatus in the embodiment 5, it is possible to efficiently search for the recommended paths from the current position of the own vehicle to the destination set by the passenger in stages by using the path search hierarchical index data having a hierarchical structure and the path search road network data, and rapidly indicate the recommended path obtained by the search through the indicating means.

Embodiment 6

An on-vehicle path guide apparatus according to the embodiment 6 has the same structure as that of the on-vehicle path guide apparatus according to the embodiments 1 to 5. Therefore, the same reference numerals are used, and descriptions thereof are omitted.

In the on-vehicle path guide apparatus according to the embodiment 6, general automobile road priority information, toll road priority information, and path search index data for a path to specified facilities are previously stored in a memory (not shown) in addition to path search index data and path search hierarchical index data used in the on-vehicle path guide apparatus according to the embodiments 1 to 5. Then, a search is made on demand by using the general automobile road priority information, the toll road priority information, and the path search index data for the path to the specified facilities instead of the path search index data and the path search hierarchical index data.

As set forth above, according to the on-vehicle path guide apparatus in the embodiment 6, it is possible to search for a recommended path from a start point to a destination, having a characteristic desired by a passenger. Further, it is possible to search for the recommended path which matches a condition desired by the passenger at high speed by switching of the index data, and provide the obtained recommended path for the passenger.

Embodiment 7

An on-vehicle path guide apparatus according to the embodiment 7 has the same structure as that of the on-vehicle path guide apparatus in the embodiment 1 shown in FIG. 1. Therefore, the same reference numerals are used, and descriptions thereof are omitted.

In the on-vehicle path guide apparatus according to the embodiments 1 to 6, when a search is made with a node closest to a current position of an own vehicle as a starting point, a recommended path starting from a position in front of the own vehicle may not be obtained. In the on-vehicle path guide apparatus according to the embodiment 7, processing is carried out to select nodes positioned in a direction in which the vehicle travels and in both directions on a link on which the own vehicle is positioned, that is, in directions of the front and the rear of the own vehicle, and efficiently search for a recommended path along which the own vehicle can reach a destination without a U-turn depending upon index data of the nodes so as to provide the obtained recommended path for a passenger through indicating means.

A description will now be given of the operation.

Figure 16:
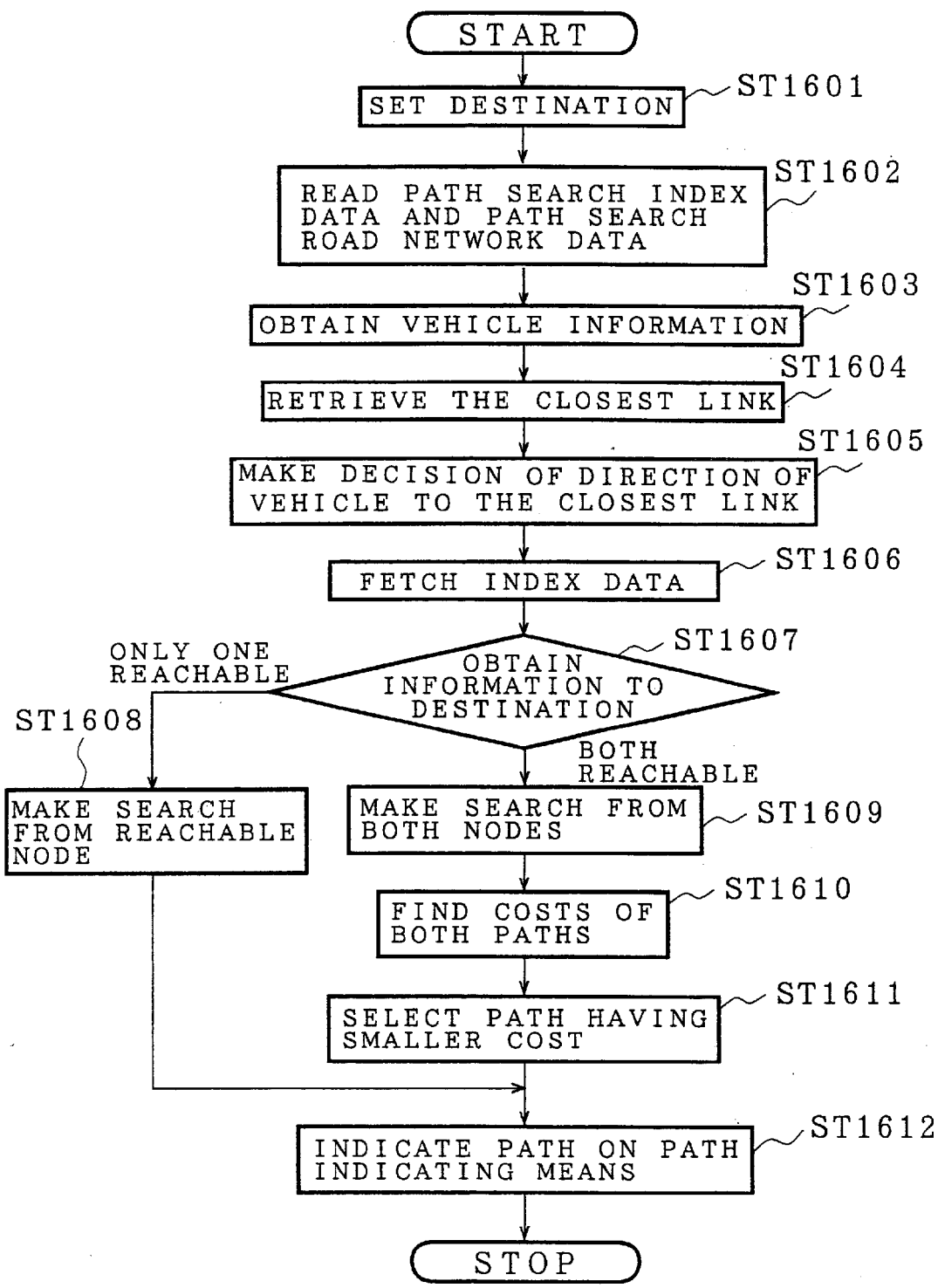
FIG. 16 is a flowchart showing the operation of an on-vehicle path guide apparatus according to the embodiment 7 of the present invention.

FIG. 16 is a flowchart showing the operation of the on-vehicle path guide apparatus according to the embodiment 7.

First, the passenger uses destination setting means 2 to set a desired destination (step ST1601). Next, path search road network data and path search index data corresponding to the current position obtained in step ST1601 are read from path search road network data storage means 6 and path search index data storage means 7 (step ST1602).

Figure 17:
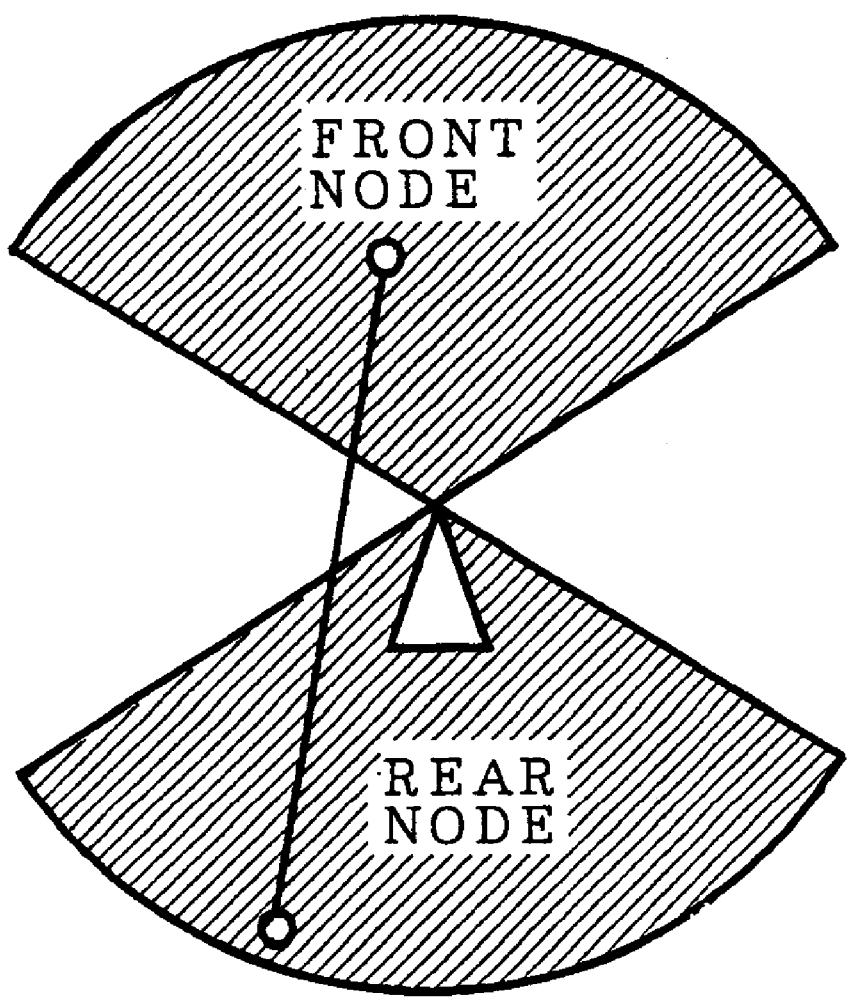
FIG. 17 is an explanatory view showing a relationship between nodes.

Subsequently, vehicle information such as position and direction of the vehicle are obtained through current position detecting means 1 (ST1603). Depending upon the vehicle information obtained in step ST1603, a link located in the closest proximity to the vehicle is retrieved from the path search road network data (step ST1604). Further, with respect to the closest link obtained in step ST1604, a decision is made of vehicle direction (up and down) with respect to the closest link depending upon the vehicle information obtained in step ST1603. In one decision method, as shown in an explanatory view of FIG. 17, the decision is made by comparing an angle of the link with the direction of the vehicle (step ST1605).

Further, processing is carried out to fetch path search index data of the nodes positioned in the directions of the front and the rear of the vehicle on the closest link (step ST1606), and information to the destination are obtained with respect to the index data fetched in step ST1606. "Information to the destination" as used herein means information showing whether or not the vehicle can reach the destination. If the vehicle can reach the destination with respect to only one of the index data, the operation proceeds to step ST1608. If the vehicle can reach the destination with respect to both the index data, the operation proceeds to step ST1609. If the vehicle can not reach the destination with respect to both the index data, the search to the destination is impossible. Then, a message to this effect is indicated to the passenger through indicating means 8, and the operation is ended (step ST1607).

When the information obtained in step ST1607 shows that the vehicle can reach with respect to only one of the index data, it is decided that a U-turn is unnecessary if the index data belongs to the node in front of the vehicle or that the U-turn is necessary if the index data belongs to the node behind the vehicle, and a search from the front node or the rear node to the destination is made through a retrieval method (steps ST303 to ST311 in FIG. 3) shown in the embodiment 1. When the search to the destination is completed, the operation proceeds to step ST1612 (step ST1608).

When the information obtained in step ST1607 shows that the vehicle can reach with respect to both the nodes, a search is made for recommended paths with respect to the index data of the front and rear nodes according to the method described in the embodiment 1 (step ST1609). When the path from the front node and the path from the rear node to the destination are found in the course of the search, or both the paths come into contact with each other in the course of the search, costs of both the paths are found. The cost is found depending upon, for example, a link length or a link width of a link forming the path. In general, the cost of a road becomes lower as the vehicle can more easily travel on the road, and the cost of the road becomes higher as travel on the road becomes more difficult. Further, a value serving as a U-turn cost is added to the cost of the path from the rear node (step ST1610).

The costs obtained in step ST1610 are compared to select the path having a lower cost as the recommended path so as to indicate the path for the passenger through the indicating means 8. If the processing is executed in the course of search, the search is continued, and the operation proceeds to step ST1612 when the search is completed (step ST1611). Finally, the obtained path is indicated to the passenger through the indicating means 8 (step ST1612).

It is to be noted that the on-vehicle path guide apparatus according to the embodiment 7 may be applied in combination with the on-vehicle path guide apparatus according to the embodiments 1 to 6.

As set forth above, according to the on-vehicle path guide apparatus in the embodiment 7, it is possible to select the nodes in the direction in which the vehicle travels and in both the directions on the link on which the own vehicle is positioned, and efficiently search for the recommended path along which the own vehicle can reach the destination without the U-turn depending upon the index data of the nodes so as to provide the obtained recommended path for the passenger through the indicating means.

Embodiment 8

Figure 18:
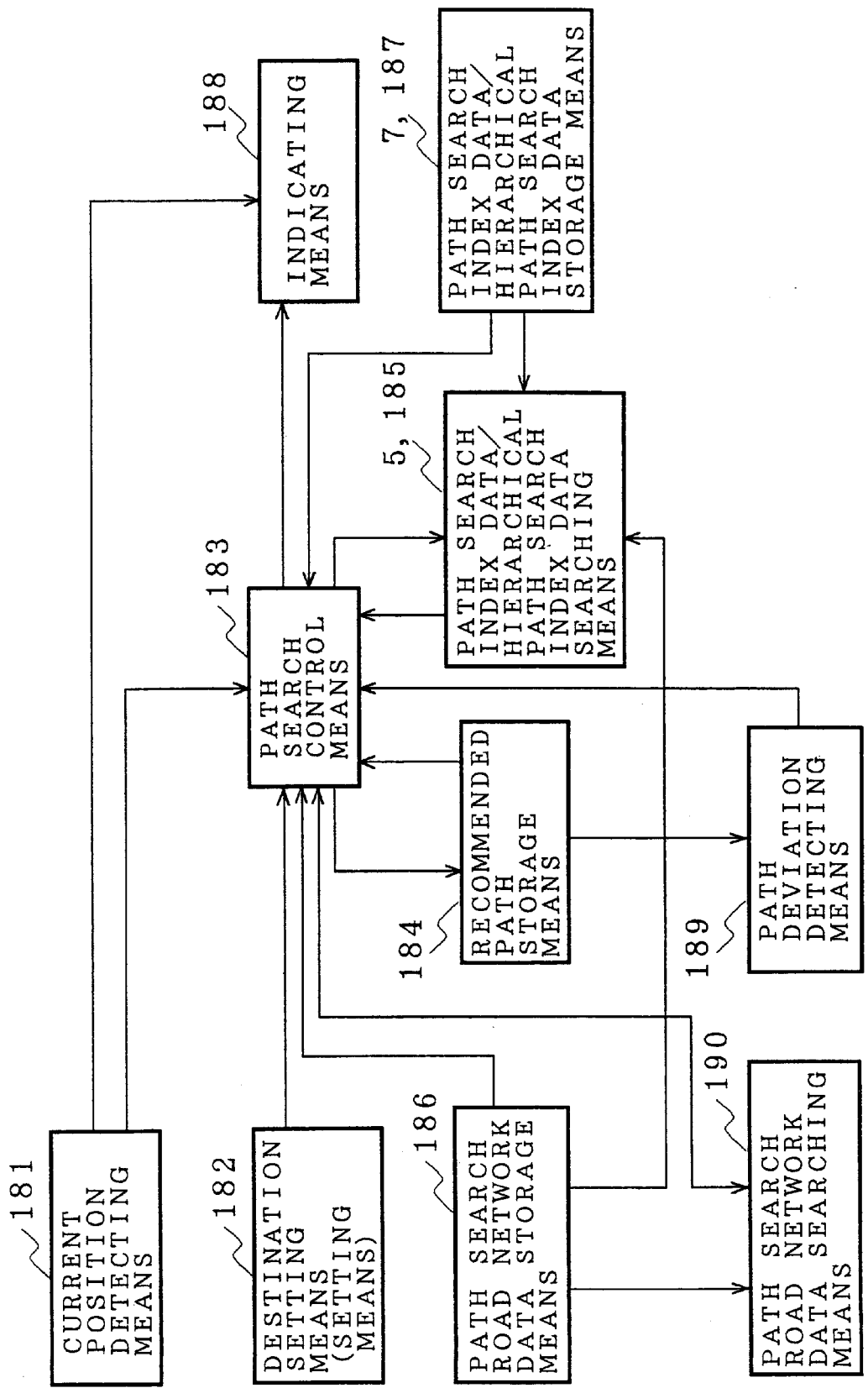
FIG. 18 is a block diagram showing an on-vehicle path guide apparatus according to the embodiment 8 of the present invention.

FIG. 18 is a block diagram showing an on-vehicle path guide apparatus according to the embodiment 8. In the drawing, reference numeral 184 means recommended path storage means, 189 is path deviation detecting means, and 190 is path search road network data searching means. Further, current position detecting means 181, destination setting means (setting means) 182, path search control means 183, path search road network data storage means 186, indicating means 188, path search hierarchical index data searching means 185, and path search hierarchical index data storage means 187 are identical with the current position detecting means 1, the destination setting means 2, the path search control means 3, the path search road network data storage means 6, and the indicating means 8 in the on-vehicle path guide apparatus according to the embodiment 1 shown in FIG. 1 and the path search hierarchical index data searching means 125 and the path search hierarchical index data storage means 127 in the on-vehicle path guide apparatus according to the embodiment 5 shown in FIG. 12. Therefore, descriptions thereof are omitted.

In the recommended path storage means 184 is stored a recommended path obtained by the path search index data searching means 5 shown in FIG. 1 or the path search hierarchical index data searching means 185 shown in FIG. 18 and the path search road network data searching means 190. In the path deviation detecting means 189, it is decided whether or not an own vehicle is positioned on a path depending upon the recommended path stored in the recommended path storage means 184 and current position information obtained by the current position detecting means 181.

In the on-vehicle path guide apparatus according to the embodiment 8, the path deviation detecting means 189 detects that a passenger deviates from the recommended path, and a search is made for a path from a position where the deviation is detected to a destination or an original recommended path by using path search index data so as to provide a result of search for the passenger.

A description will now be given of the operation.

Figure 19:
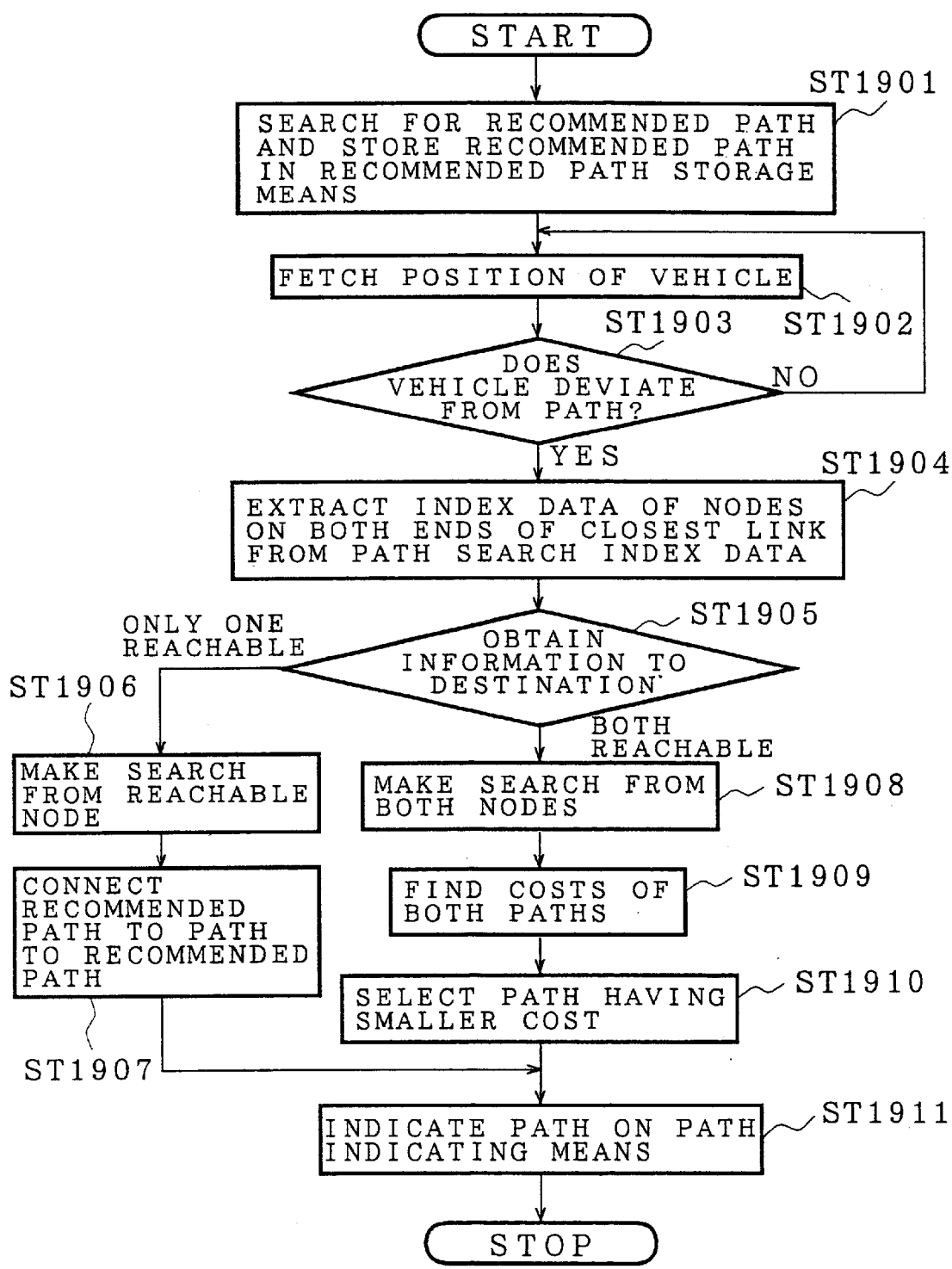
FIG. 19 is a flowchart showing the operation of the on-vehicle path guide apparatus of FIG. 18.

FIG. 19 is a flowchart showing the operation of the on-vehicle path guide apparatus according to the embodiment 8.

First of all, a search is made for a recommended path according to the search method shown in the embodiment 1, and the recommended path obtained by the search is stored in the recommended path storage means 184 (step ST1901). Next, vehicle information such as position of the own vehicle and vehicle direction of the own vehicle are obtained from the current position detecting means 181 (step ST1902).

Subsequently, it is decided in the path deviation detecting means 189 whether or not the own vehicle is positioned on the recommended path obtained in step ST1901 depending upon the vehicle information obtained in step ST1902. At the time, if the own vehicle is positioned on the path, the operation returns to step ST1902. If it is decided that the own vehicle is not positioned on the path, the operation proceeds to step ST1904. In order to decide whether or not the vehicle is on the path, a link closest to the own vehicle is retrieved from a path search road network to decide whether or not the link is a link on the path (step ST1903).

When it is decided in step ST1903 that the own vehicle is not positioned on the path, processing is carried out to fetch index data of nodes at both ends connected to the closest link obtained in step ST1903 (step ST1904).

With respect to the index data fetched in step ST1904, information to the destination is obtained. "Information to the destination" as used herein means information showing whether or not the vehicle can reach the destination. If the vehicle can reach the destination with respect to only one of the index data, the operation proceeds to step ST1906. If the vehicle can reach the destination with respect to both the index data, the operation proceeds to step ST1908. If the vehicle can not reach the destination with respect to both the index data, the search to the destination is impossible. Then, a message to this effect is indicated to the passenger through indicating means 188, and the operation is ended (step ST1905).

When the information obtained in step ST1905 shows that the vehicle can reach with respect to only one of the index data, a search to the destination from the front node if the index data belongs to the node in front of the vehicle or from the rear node if the index data belongs to the node behind the vehicle is made through the retrieval method shown in the embodiment 1. In the search, if the link or the node is found on the recommended path stored in step ST1901, the operation proceeds to step ST1907. Alternatively, if the search reaches the destination without finding the link or the node on the recommended path, the operation proceeds to step ST1911 (step ST1906).

A path to the recommended path obtained in step ST1905 is connected to the recommended path, and the operation proceeds to step ST1911 (step ST1907).

When the information obtained in step ST1905 shows that the vehicle can reach with respect to both the nodes, a search is made for recommended paths with respect to the index data of the front and rear nodes according to the search method described in the embodiment 1 (step ST1908).

When the path from the front node and the path from the rear node to the recommended path are obtained in the course of the search, costs of both the paths are found. The cost is found depending upon, for example, a link length or a link width of a link forming the path. In general, the cost of a road becomes lower as the vehicle can more easily travel on the road, and the cost of the road becomes higher as travel on the road becomes more difficult. Further, a U-turn cost is added to the cost of the path from the rear node (step ST1909).

The costs obtained in step ST1909 are compared to connect the path having a lower cost to the recommended path, and the operation proceeds to step ST1911. If the processing is executed in the course of search, the search is continued, and the operation proceeds to step ST1911 when the search is completed (step ST1910). Finally, the obtained optimal path is indicated to the passenger through the indicating means 188 (step ST1911).

As set forth above, according to the on-vehicle path guide apparatus in the embodiment 8, it is possible to detect that the passenger deviates from the recommended path through the path deviation detecting means, and search for the optimal path from the position where the deviation is detected to the destination or the original recommended path by using the path search index data so as to provide a result of the search for the passenger.

Embodiment 9

Figure 20:
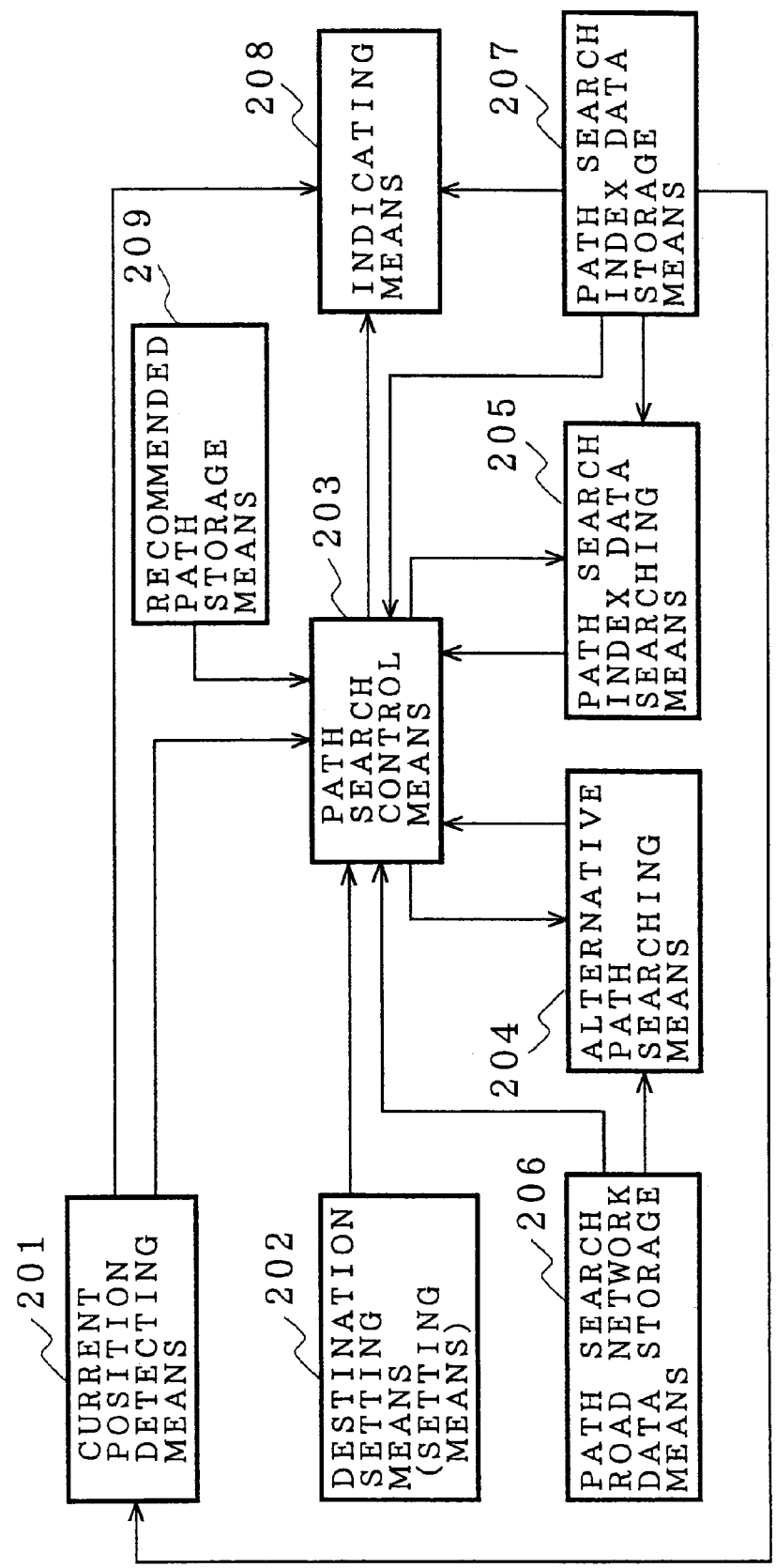
FIG. 20 is a block diagram showing an on-vehicle path guide apparatus according to the embodiment 9 of the present invention.

FIG. 20 is a block diagram showing an on-vehicle path guide apparatus according to the embodiment 9 of the present invention. In the drawing, reference numeral 201 means current position detecting means, 202 is destination setting means (setting means), 203 is path search control means, 204 is alternative path searching means for making a path search by increasing a cost of a recommended path, 205 is path search index data searching means, 206 is path search road network data storage means, 207 is path search index data storage means, 208 is indicating means, and 209 is recommended path storage means in which the recommended path is stored.

In the on-vehicle path guide apparatus according to the embodiment 9, when it is found that, for example, a traffic jam is generated on a recommended path, the path search is made by setting the cost of the recommended path higher to search for a new recommended path to bypass the above recommended path so as to provide the new path for a passenger.

A description will now be given of the operation.

Figure 21:
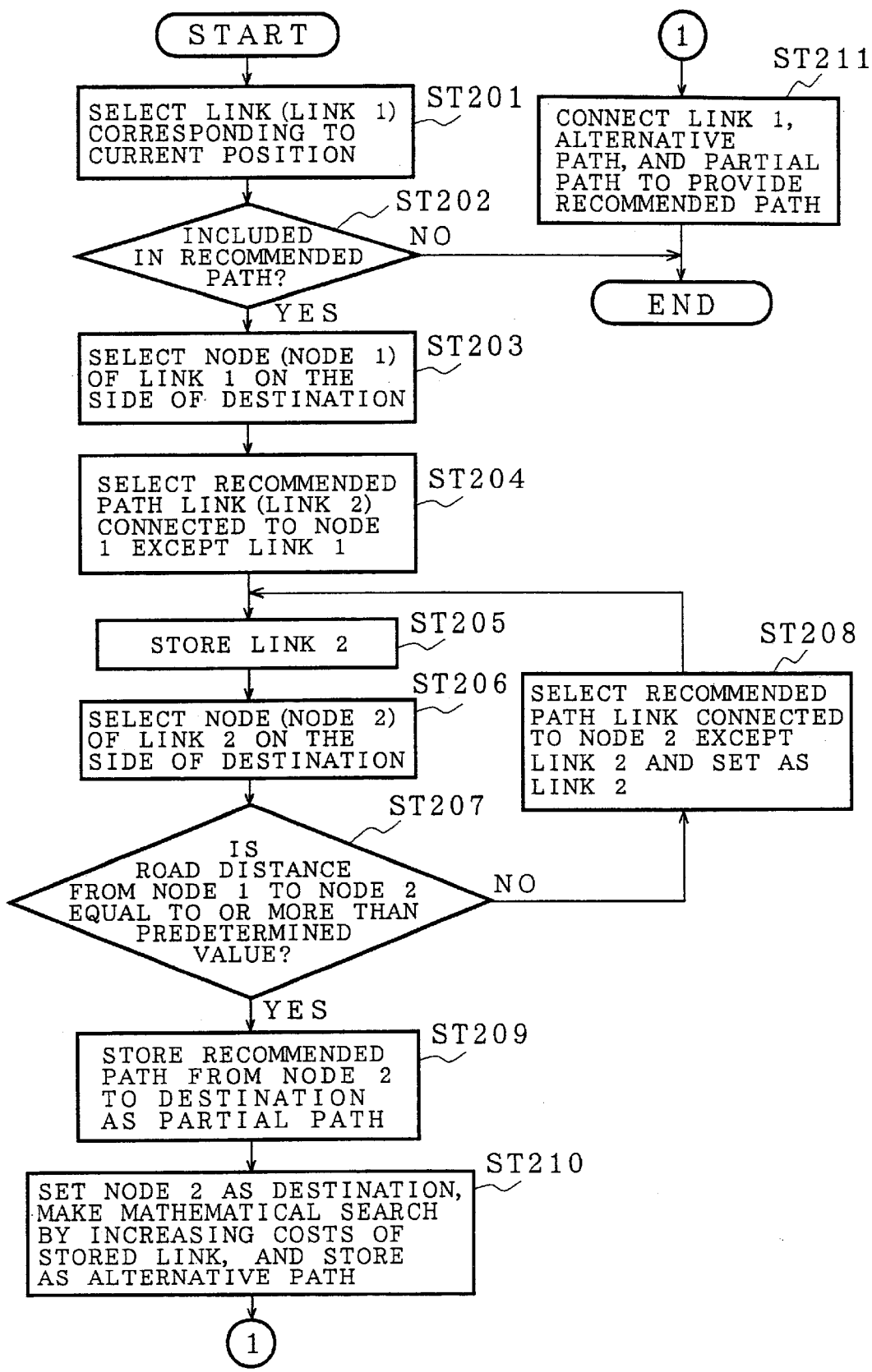
FIG. 21 is a flowchart showing the operation of the on-vehicle path guide apparatus of FIG. 20.
Figure 22:
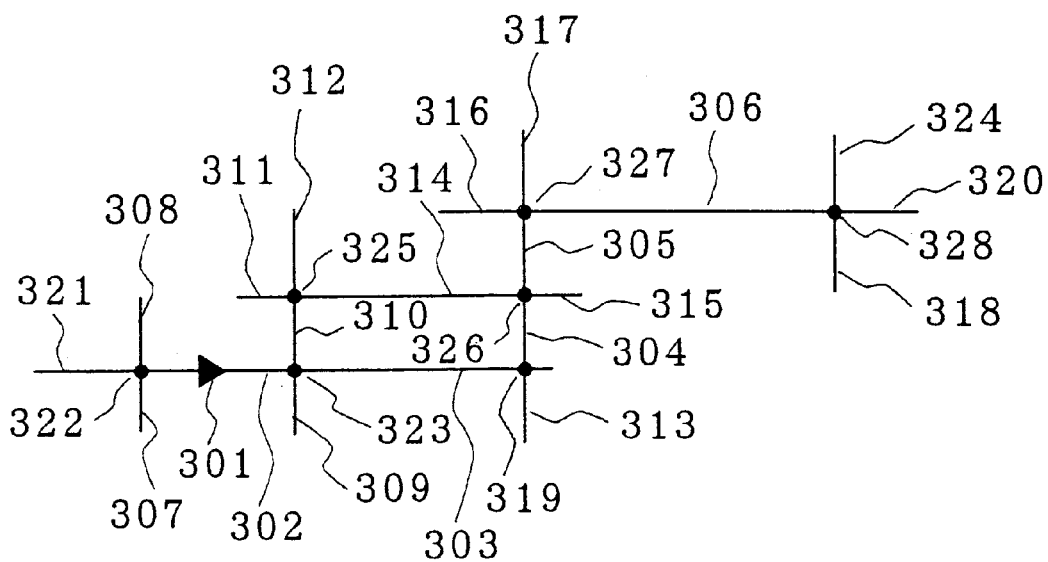
FIG. 22 is an explanatory view showing an illustrative road network.

FIG. 21 is a flowchart showing the operation of the on-vehicle path guide apparatus according to the embodiment 9. FIG. 22 is an explanatory view showing a road network, illustrating the operation of the on-vehicle path guide apparatus of FIG. 20. In the drawing, reference numeral 301 means a current position, 302 to 306 are links of the recommended path, 307 to 321 are links except the recommended path, and 322 to 328 are nodes.

Figure 23:
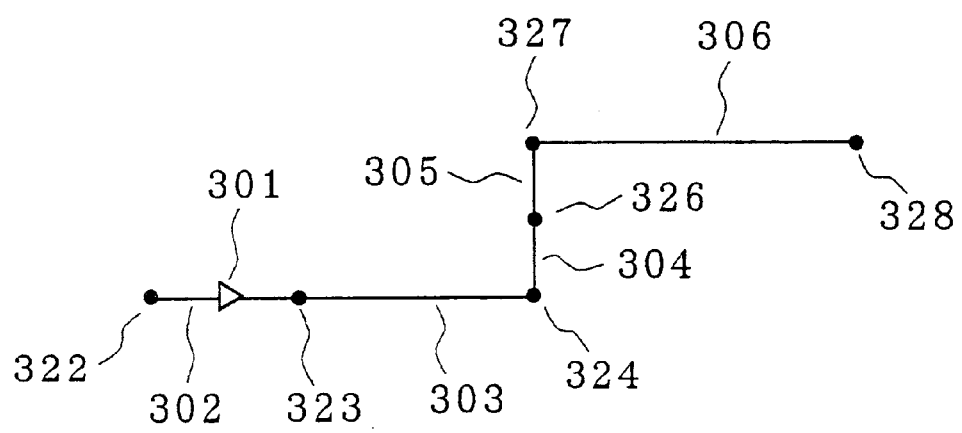
FIG. 23 is an explanatory view showing an extracted recommended-path portion.
Figure 24:
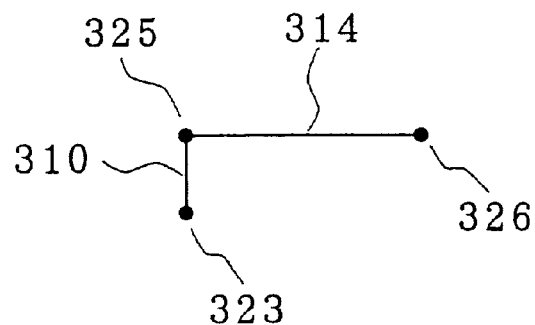
FIG. 24 is an explanatory view showing an illustrative alternative path created by alternative path searching means.
Figure 25:
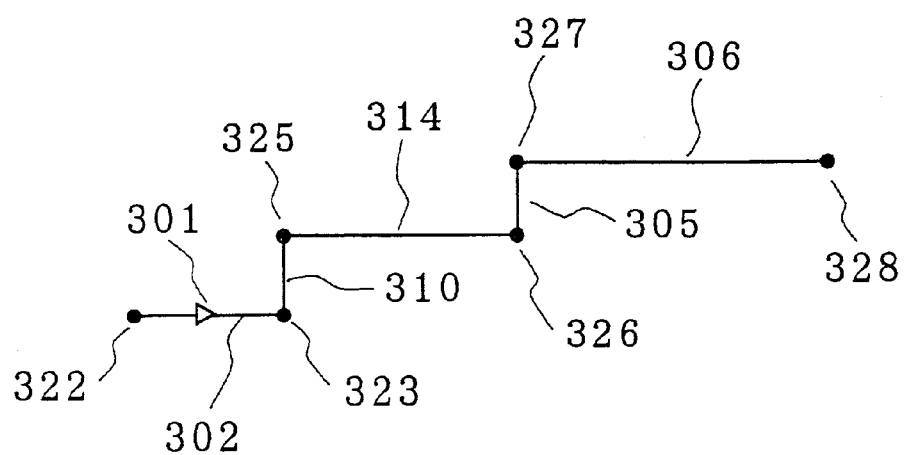
FIG. 25 is a diagram showing a recommended path after the alternative path is created.

FIG. 23 is a diagram showing an extracted recommended path portion in the road network shown in FIG. 22. FIG. 24 is an explanatory view showing an alternative path created by the alternative path searching means 204. FIG. 25 is a diagram showing a recommended path after the alternative path is created.

First of all, a link corresponding to current position information detected by the current position detecting means 201 is fetched from the path search road network data storage means 206, and is set as a link 1 (step ST201).

It is decided whether or not the link 1 is included in the recommended path (step ST202). If not included, the operation is ended. In FIG. 23, the link 302 serves as the link 1. If the link 1 is included in the recommended path, a node of the link 1 on the side of the destination is selected, and is set as a node 1 (step ST203). In FIG. 23, the link 323 serves as the node 1.

Subsequently, a link on the recommended path connected to the node 1 except the link 1 is selected, and is set as a link 2 (step ST204). The set link 2 is stored in, for example, a working memory (not shown) (step ST205). A node of the link 2 on the side of the destination is selected, and is set as a node 2 (step ST206). It is decided whether or not a road distance from the node 1 to the node 2 exceeds a predetermined value (step ST207). If the road distance does not exceed the predetermined value, a link on the recommended path connected to the node 2 except the link 2 is selected, and is newly set as the link 2 (step ST208). Thereafter, the operation proceeds to step ST205.

If, in the decision in step ST207, the road distance from the node 1 to the node 2 exceeds the predetermined value, the recommended path from the node 2 to the destination is defined as a partial path, and is stored in, for example, the working memory (step ST209). In FIG. 23, when it is assumed that the node 326 becomes the node 2, the links 305 and 306 serve as the partial path.

Then, the node 2 is set as the destination, a search is made through a mathematical algorithm such as Dijkstra's algorithm by increasing costs of the stored links from the node 1 to the node 2, and the path obtained by the search is stored as the alternative path (step ST210). In FIG. 24, the links 310 and 314 serve as the alternative paths. The link 1, the alternative path stored in step ST210, and the partial path stored in step ST209 are connected to provide a new recommended path (step ST211). It is thereby possible to create the new recommended path shown in FIG. 25.

As set forth above, according to the on-vehicle path guide apparatus in the embodiment 9, when it is found that, for example, the traffic jam is generated on the recommended path, the passenger sets the cost of the recommended path higher, and the alternative path searching means makes -the path search. It is thereby possible to search for the new recommended path to bypass the above recommended path, and provide the obtained new recommended path for the passenger through the indicating means.

Embodiment 10

Figure 26:
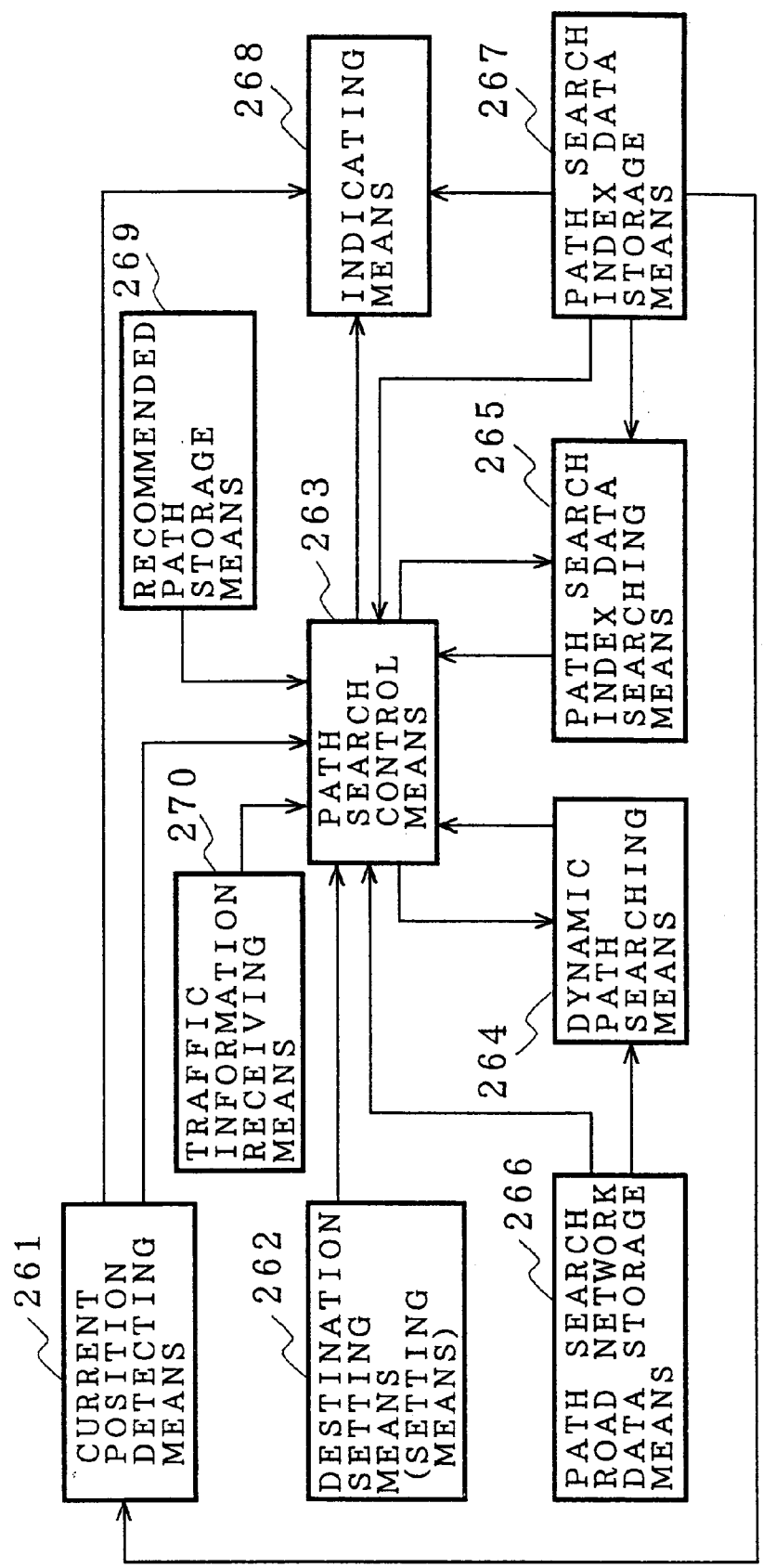
FIG. 26 is a block diagram showing an on-vehicle path guide apparatus according to the embodiment 10 of the present invention.

FIG. 26 is a block diagram showing an on-vehicle path guide apparatus according to the embodiment 10 of the present invention. In the drawing, reference numeral 261 means current position detecting means, 262 is destination setting means (setting means), 263 is path search control means, 265 is path search index data searching means, 266 is path search road network data storage means, 267 is path search index data storage means, 268 is indicating means, 269 is recommended path storage means in which a recommended path is stored, 270 is traffic information receiving means for receiving dynamic traffic information transmitted from the outside on demand, and 264 is dynamic path searching means for making a path search while reflecting the contents of the dynamic traffic information in a cost.

In the on-vehicle path guide apparatus according to the embodiment 10, a node on the recommended path is defined as a destination, and the path search is made by calculating a cost in which the dynamic traffic information is reflected so as to provide the obtained recommended path for a passenger.

A description will now be given of the operation.

Figure 27:
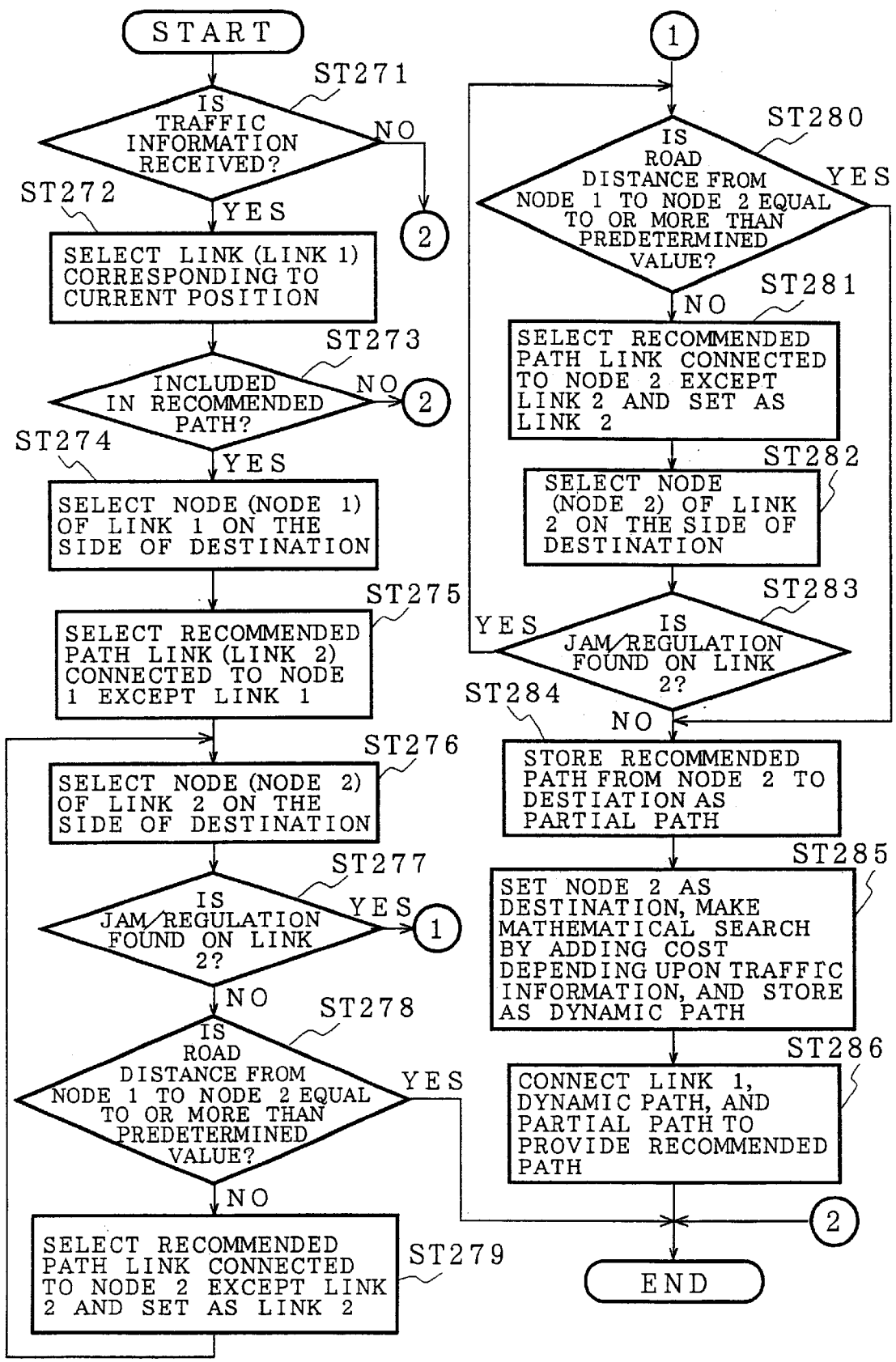
FIG. 27 is a flowchart showing the operation of the on-vehicle path guide apparatus of FIG. 26.

FIG. 27 is a flowchart showing the operation of the on-vehicle path guide apparatus according to the embodiment 10 of the present invention. FIG. 28 is an explanatory view of a format of traffic information data received by the traffic information receiving means 270 and including a code showing an area such as secondary mesh, a road link number showing a road in the area, jam information showing the degree of traffic jam on the road, and regulation information showing whether or not the road is negotiable. FIG. 29 is an explanatory view showing a correspondence between traffic information data showing, for example, traffic jam and regulation, and path search road network data.

First of all, it is decided whether or not traffic information including a current position of an own vehicle detected by the current position detecting means 261 is received (step ST271). If not received, the operation is ended. Next, a link corresponding to the current position is selected from road network data, and is set as a link 1 (step ST272). Further, it is decided whether or not the link 1 is included in the recommended path (step ST273). If the link 1 is not included in the recommended path, the operation is ended. If included in the recommended path, a node of the link 1 on the side of the destination is selected, and is set as a node 1 (step ST274).

Subsequently, a link on the recommended path connected to the node 1 except the link 1 is selected, and is set as a link 2 (step ST275). A node of the link 2 on the side of the destination is selected, and is set as a node 2 (step ST276). It is decided whether or not information about jam or regulation is found on the link 2 (step ST277). It is possible to decide whether or not the jam and the regulation are found by converting the link 2 into a road link number of the traffic information data by using the correspondence table shown in FIG. 29. If neither the jam nor the regulation is found, it is decided whether or not a road distance from the node 1 to the node 2 exceeds a predetermined value (step ST278). If the road distance does not exceed the predetermined value, a link on the recommended path connected to the node 2 except the link 2 is selected, and is newly set as the link 2 (step ST279). Thereafter, the operation branches to step ST276.

If the road distance from the node 1 to the node 2 exceeds the predetermined value, the operation is ended. If the jam and the regulation are found, it is decided whether or not the road distance from the node 1 to the node 2 exceeds the predetermined value (step ST280). If exceeds the predetermined value, the operation branches to step ST284. If the road distance from the node 1 to the node 2 does not exceed the predetermined value, a link on the recommended path connected to the node 2 except the link 2 is selected, and is newly set as the link 2 (step ST281). A node of the link 2 on the side of the destination is selected, and is set as the node 2 (step ST282).

It is decided whether or not the jam and the regulation are found on the link 2 (step ST283). If the jam and the regulation are found, the operation branches to step ST280. If neither the jam nor the regulation is found, the recommended path from the node 2 to the destination is stored as a partial path (step ST284). Then, while adding a cost depending upon the traffic information, a search is made from the node 1 to the node 2 through a mathematical algorithm such as Dijkstra's algorithm, and the path obtained by the search is stored as a dynamic path (step ST285). The link 1, the dynamic path stored in step ST285, and the partial path stored in step ST284 are connected to provide a new recommended path (step ST286).

Though the jam information and the regulation information are used to determine the destination in the dynamic search, it is to be noted that only the regulation information may be used for the decision. Further, in case of the decision of jam, the decision may be made by selecting only a high degree of jam.

As set forth above, according to the on-vehicle path guide apparatus in the embodiment 10, it is possible to receive the dynamic traffic information through the traffic information receiving means, and define the node on the recommended path as the destination so as to calculate the cost in which the dynamic traffic information is reflected. Further, it is possible to search for the recommended path depending upon the result of the cost calculation so as to provide the obtained recommended path for the passenger through the indicating means 268.

Embodiment 11

Figure 30:
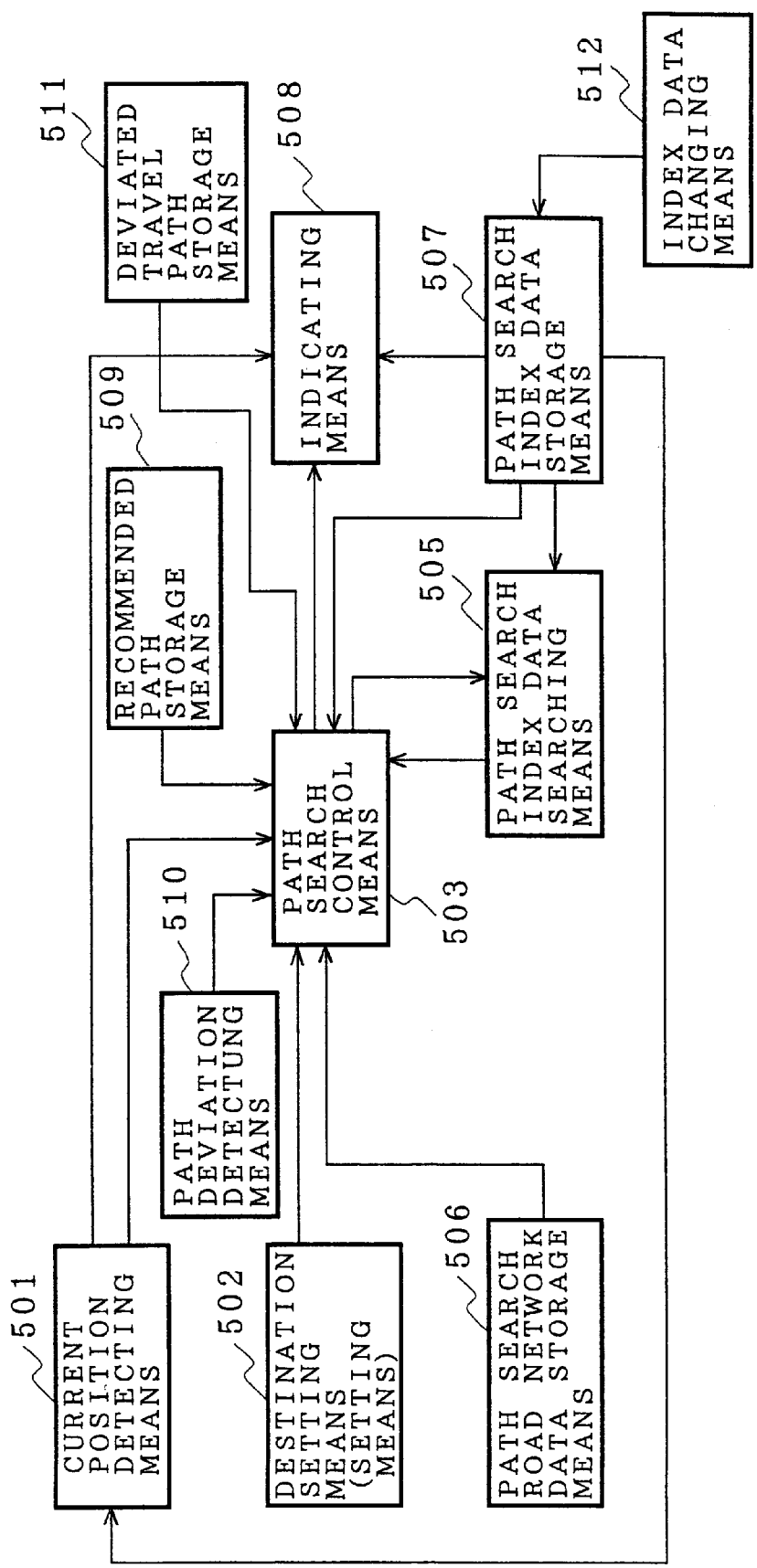
FIG. 30 is a block diagram showing an on-vehicle path guide apparatus according to the embodiment 11 of the present invention.

FIG. 30 is a block diagram showing an on-vehicle path guide apparatus according to the embodiment 11 of the present invention. In the drawing, reference numeral 501 means current position detecting means, 502 is destination setting means (setting means), 503 is path search control means, 505 is path search index data searching means, 506 is path search road network data storage means, 507 is path search index data storage means, 508 is indicating means, 509 is recommended path storage means in which a recommended path is stored, 510 is path deviation detecting means for detecting that a driver deviates from the recommended path, 511 is deviation travel path storage means in which a travel path after the deviation from the recommended path is stored, and 512 is index data changing means for changing index data.

In the on-vehicle path guide apparatus according to the embodiment 11, when an own vehicle deviates from the recommended path to the same destination the predetermined number of times or more to travel along completely the same deviation path, the index data changing means stores the deviation path such as path chosen according to a driver's taste as the recommended path in the path search index data storage means, and the deviation path is provided for the passenger as the recommended path.

A description will now be given of the operation.

Figure 31:
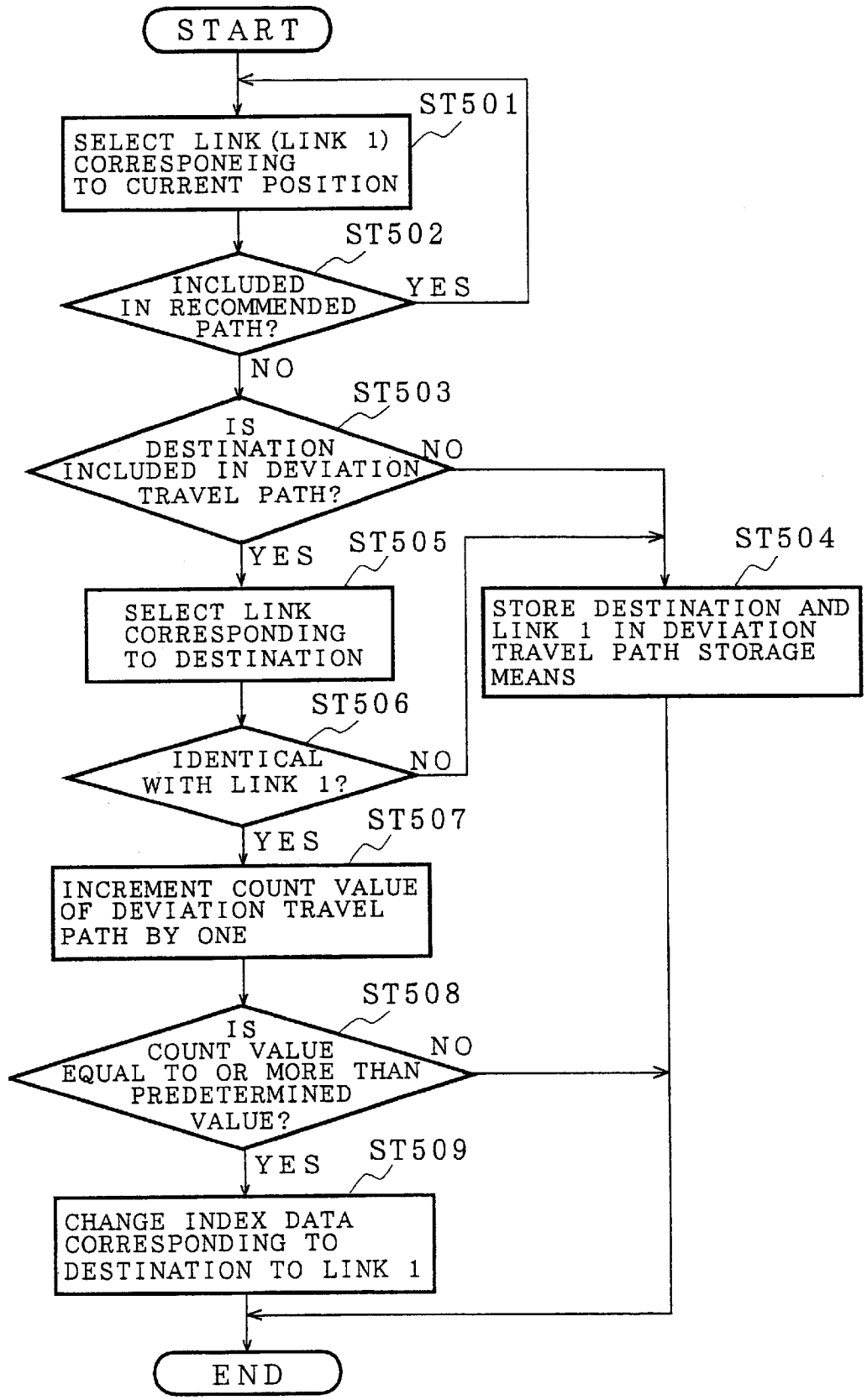
FIG. 31 is a flowchart showing the operation of the on-vehicle path guide apparatus of FIG. 30.

FIG. 31 is a flowchart showing the operation of the on-vehicle path guide apparatus according to the embodiment 11. FIG. 32 is an explanatory view showing a data structure of the deviation travel path. The deviation travel path has the data structure including coordinates of a destination when the own vehicle deviates from the recommended path, a mesh code of a deviation link, a link number, the same destination, and an area in which a count value showing the number of times a combination of links is caused is stored.

First of all, a link corresponding to own vehicle current position information detected by the current position detecting means 501 is selected from path search road network data, and is set as a link 1 (step ST501). It is decided whether or not the link 1 is included in the recommended path (step ST502). If included, the operation branches to step ST501. If the link 1 is not included in the recommended path, it is decided depending upon the coordinates of the destination whether or not the destination set in the destination setting means 502 is included in the deviation travel path (step ST503). If not included, the destination and the link 1 are stored in the deviation travel path storage means 511 (step ST505). If the destination is included in the deviation travel path, a link corresponding to the destination is selected from the deviation travel path (step ST504), and the selected link is compared with the link 1 (step ST506).

If the selected link is different from the link 1, the operation branches to step ST504. If the link selected in step ST505 is identical with the link 1, a count value of the corresponding deviation travel path is incremented by one (step ST507). It is decided whether or not the count value is equal to or more than a predetermined value (step ST508). If the count value is less than the predetermined value as a result of decision, the operation is ended. If the count value is equal to or more than the predetermined value, index data corresponding to the destination is changed to the link 1 (step ST509).

In the above discussion, as a condition of a decision of the destination, it is decided whether or not the destinations are identical. However, it may be decided that the destinations are identical as long as the index data including the destination are in the same area. In this case, destination area information is recorded in the destination in the data structure of the deviation travel path shown in FIG. 32. Further, when a difference in coordinates between the destinations is within a predetermined range, the destinations may be regarded as the same destination.

As set forth above, according to the on-vehicle path guide apparatus in the embodiment 11, when it is decided that the travel path deviating from the same destination is different from the recommended path the predetermined number of times or more, it is possible to store the deviation path as the recommended path in the path search index data storage means so as to set the recommended path. Thus, it is thereby possible to provide, for example, the recommended path chosen according to the driver's taste for the driver.

Embodiment 12

Since an on-vehicle path guide apparatus according to the embodiment 12 is identical with the on-vehicle path guide apparatus according to the embodiment 1 shown in FIG. 1, descriptions thereof are omitted.

In case of the on-vehicle path guide apparatus according to the embodiment 1, it is necessary to build a bulk storage (such as RAM) into the path search index data searching means 5 because index data to all destination areas should concurrently be stored in the memory 25 (see FIG. 2). In the on-vehicle path guide apparatus according to the embodiment 12, the index data are divided for each destination to be previously stored in path search index data storage means 7. The divided index data are sequentially read from the path search index data storage means 7 until a vehicle reaches a position at a predetermined distance from the destination. It is thereby possible to reduce a size of data which is concurrently read, and efficiently search for a recommended path at high speed.

A description will now be given of the operation.

Figure 33:
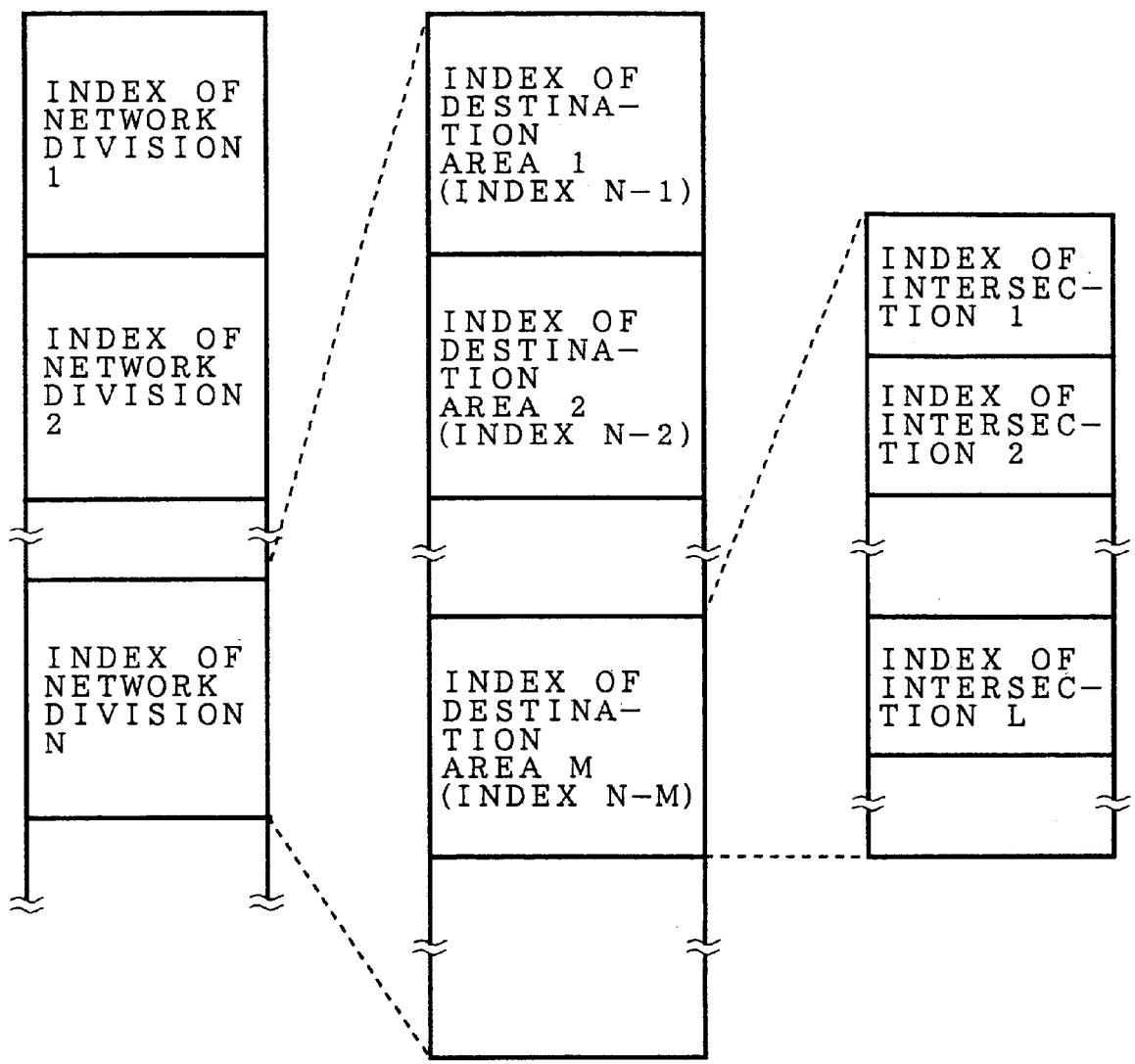
FIG. 33 is an explanatory view showing a structure of index data.

FIG. 33 shows a structure of the index data stored and used in the path search index data storage means 7 in the on-vehicle path guide apparatus according to the embodiment 12. The index data is created for each division of a road network. In the road network, a division of a road section may include a division having a definite form such as secondary mesh (National Standard Grid Cell) used in Geographical Survey Institute or a division having an indefinite form such as division according to an administrative section. Further, the divisions may overlap each other. Index data of each division has index data for each destination area. In this case, the destination area may be identical with the division of the network, or another division obtained by subdividing the division of the network, provided that the destination areas can not overlap each other.

The index data of each destination area includes index of each intersection in the road network division, and shows an optimal path to the next intersection by specifying an outflow link with respect to a link connected to the intersection. It is possible to obtain the optimal path by setting one to several destination representative points in each destination area, and finding an optimal path from each intersection to the destination representative point. Thus, when the vehicle unnecessarily approaches the destination area, the optimal path to the destination representative point differs from the optimal path to the destination. Hence, the search using the index data is stopped before the vehicle approaches the position within the predetermined distance from the destination. In later steps, a search to the set destination is made by using a normal path search method.

Figure 34:
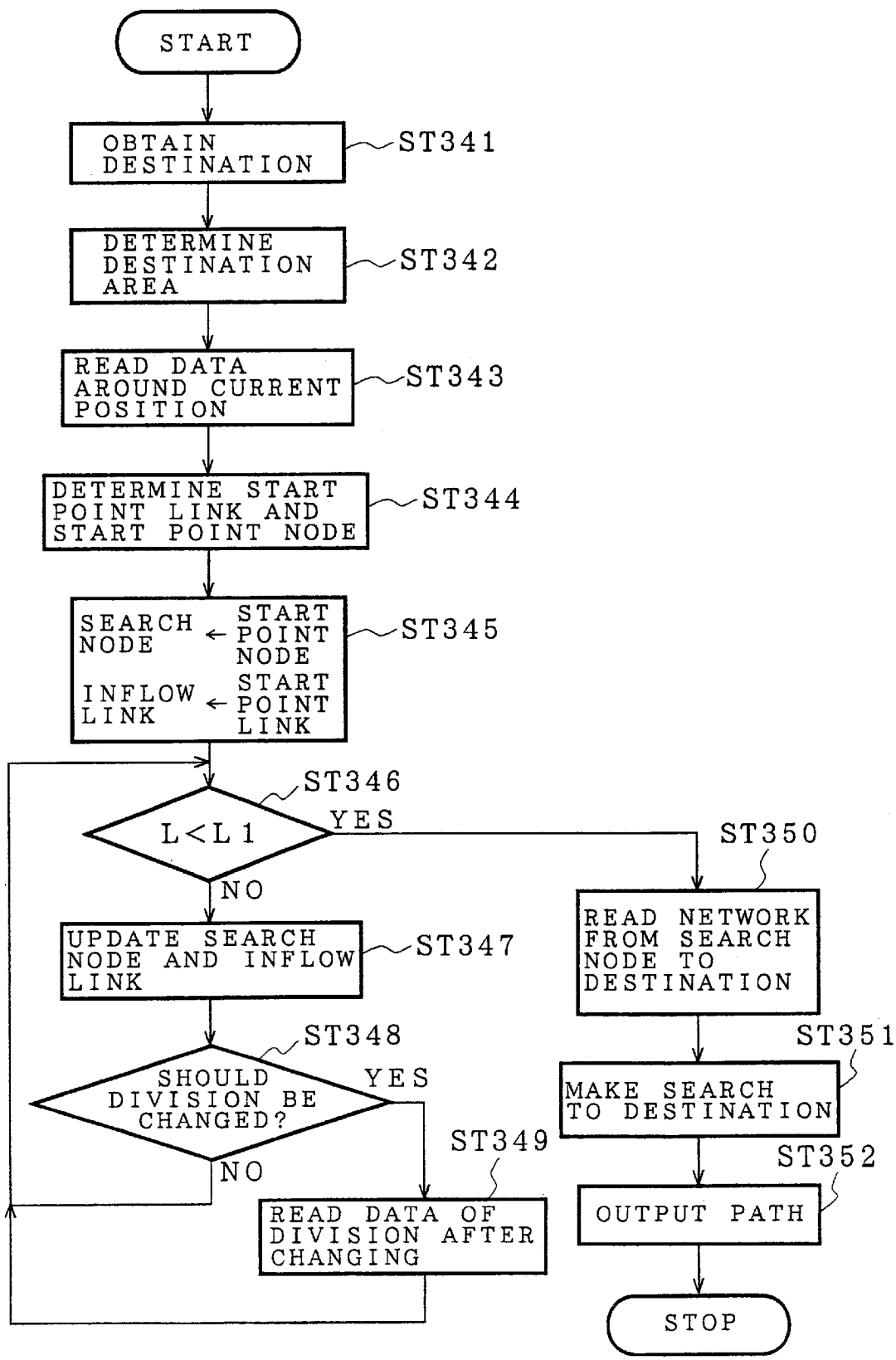
FIG. 34 is a flowchart showing the operation of an on-vehicle path guide apparatus according to the embodiment 12 of the present invention.

FIG. 34 is a flowchart showing the operation of the on-vehicle path guide apparatus according to the embodiment 12. Referring now to the flowchart, a description will be given of a procedure for searching for the optimal path from a current position to the destination.

First, a passenger uses destination setting means 2 to set a desired destination (step ST341). Path search control means 3 specifies the destination area including the destination according to coordinates of the destination or specification from the destination setting means 2 (step ST342). Next, current vehicle position information of an own vehicle is fetched from current position detecting means 1. Network data of the road network division including a vehicle position, and index data to the destination area are respectively read from path search road network data storage means 6 and the path search index data storage means 7 (step ST343). For example, in case of a network division N of the vehicle position and a destination area M, index data N-M shown in FIG. 33 is read.

Subsequently, on path search road network data, a link closest to the vehicle position is specified and defined as a start point link, and a node in front of the vehicle on the start point link is defined as a start point node (step ST344).

A search intersection is set at the start point node, and an inflow link is set on the start point link (step ST345), thereafter starting a search.

A distance in a straight line between the search intersection and the coordinates of destination is set as L. If L is less than a specified distance L1, the operation proceeds to step ST350. L is equal to or more than L1, processing is carried out in step ST347 and later steps (step ST346). Here, it is to be understood that L1 is sufficiently long as compared with the size of the destination division, and the vehicle can reach an intersection in the destination division along the same path if the distance L is equal to or more than L1.

In step ST347, index to a search node is referred to find the next intersection on the optimal path and a link flowing into the intersection, and set the intersection and the link as a new search node and a new inflow link. Further, the search node and inflow link are stored as components of path data.

In step ST348, it is decided whether or not the new search node is located in the same division as the preceding network division. If the division is changed, network data and index data of a new division are read (step ST349). Thereafter, the operation returns to step ST346. In this case, index corresponding to the destination area is read. For example, when the destination area is M and the search node is in a division N' instead of the division N, index N'-M is read. If the division is not changed, the operation returns to step ST346.

In step ST350, network data from an area including the search node and to the area including the coordinates of the destination is read. Index data is not read. In step ST351, a search is made from the search node to the destination through a known search method such as Dijkstra's algorithm, or A$^*$ algorithm.

In step ST352, histories of the search node and the inflow link are connected to a result of search from a final search node to the destination, thereby creating path data from a start point to the destination and outputting the path data to display means.

As set forth above, according to the on-vehicle path guide apparatus in the embodiment 12, the index data are divided for each destination to be previously stored in the path search index data storage means. Then, it is possible to sequentially read the divided index data until the vehicle reaches the position at the predetermined distance from the destination so as to search for the recommended path. It is thereby possible to calculate the recommended path at high speed through a smaller memory, and rapidly provide the obtained recommended path for the passenger.

Embodiment 13

Since an on-vehicle path guide apparatus according to the embodiment 13 is identical with the on-vehicle path guide apparatus according to the embodiment 1 shown in FIG. 1, descriptions thereof are omitted.

In case of the structure of the index data shown in FIG. 33 used in the on-vehicle path guide apparatus according to the embodiment 12, an amount of data concurrently read in the path search index data searching means 5 becomes smaller than would be in the on-vehicle path guide apparatus according to the embodiment 1, while an amount of data held by the path search index data storage means 7 becomes larger than would be in the on-vehicle path guide apparatus according to the embodiment 1. Hence, a system having a network covering a wide area such as the whole of Japan requires a larger external storage capacity for use in the path search index data storage means 7. For example, when a CD-ROM is employed, several or more CD-ROMs require a large scale configuration such as CD-ROM changer for appropriate switching of the CD-ROMs.

In the on-vehicle path guide apparatus according to the embodiment 13, a new path search index data structure is employed to set an amount of read data smaller so as to reduce a memory size of a storage unit in path search index data storage means 7.

A description will now be given of the operation.

Figure 35:
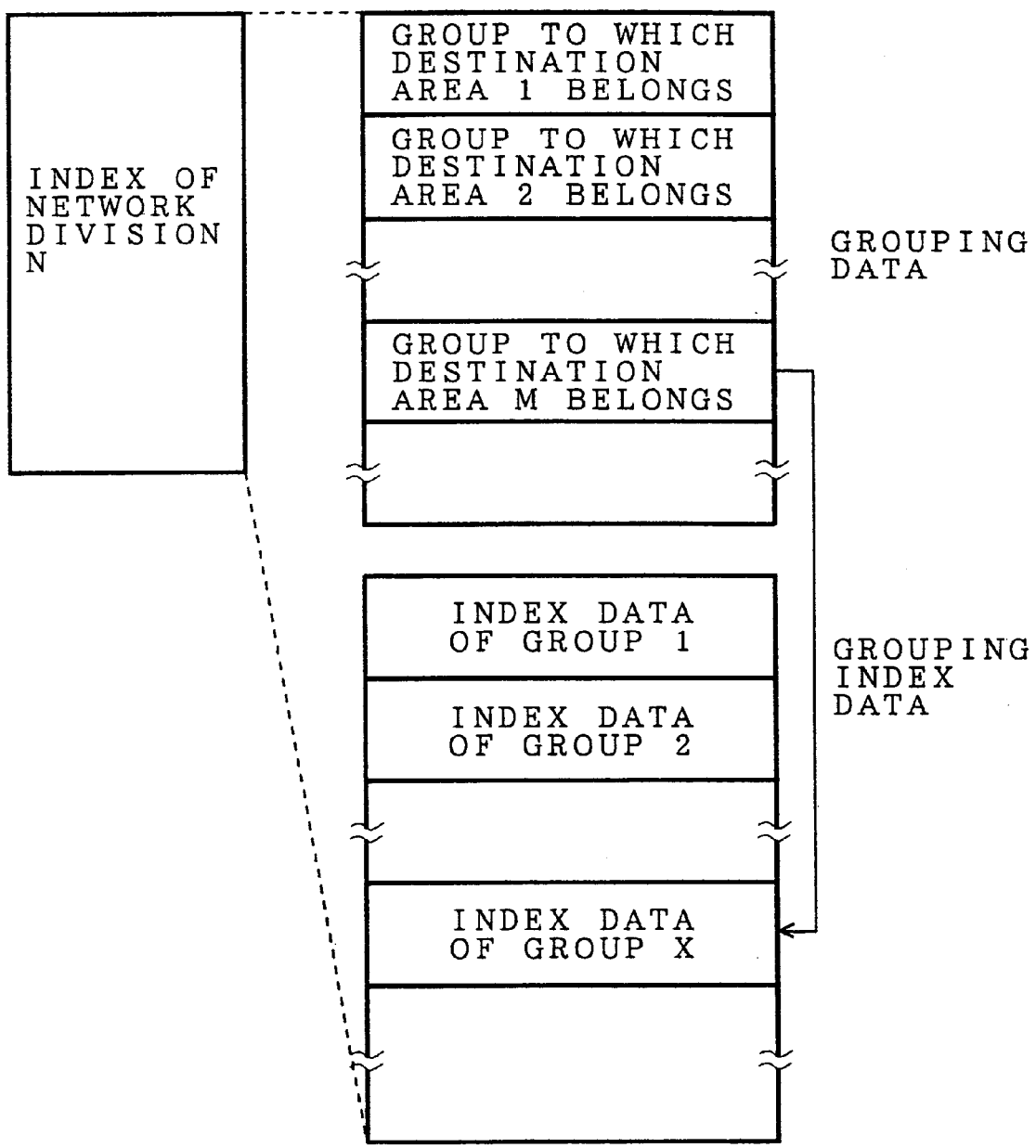
FIG. 35 is an explanatory view showing an illustrative grouping structure of index data used in an on-vehicle path guide apparatus according to the embodiment 13 of the present invention.

FIG. 35 is an explanatory view showing a structure of path search index data used in the on-vehicle path guide apparatus according to the embodiment 13. The use of the index data structure can reduce a load of an external storage unit while keeping the amount of read data small. Instead of a destination area integrally having index data in index data of each division, the destination area is grouped, and index data is set for each group. Here, it is to be understood that the index are completely matched at all intersections in the division with respect to a destination belonging to the same group. For example, in a division in the vicinity of Tokyo, it can be expected that completely the same path can be set as an optimal path for all destinations in an area such as Osaka, Hiroshima, or Kyusyu. On the other hand, the probability is high that an optimal path for a destination in Osaka will be different from an optimal path for a destination in Hiroshima when viewed from a division in the vicinity of Okayama. Hence, a grouping is uniquely made for each division.

In order to obtain index to the destination area from data shown in FIG. 35, grouping data is read to detect to which group the destination area belongs in the division, and index data corresponding to the obtained group is read.

Figure 36:
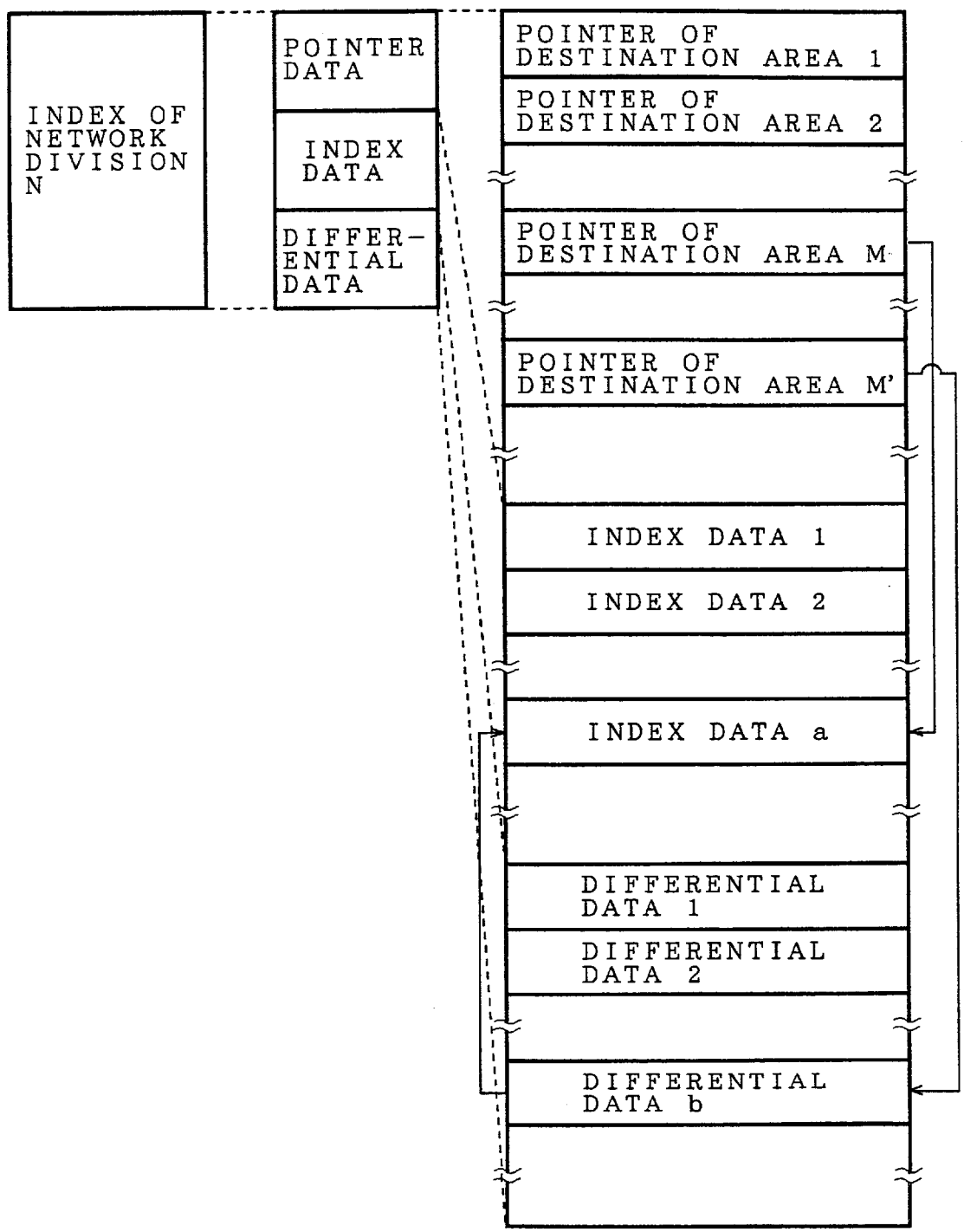
FIG. 36 is an explanatory view showing an index data structure used to reduce a storage capacity of path search index data storage means.

FIG. 36 shows an index data structure used to reduce a storage capacity of the path search index data storage means 7 greater than would be in the index data structure shown in FIG. 35. The index data of each network division includes pointer data, index data, and differential data.

The pointer data uniquely relates the index data or the differential data to each destination area. The destination areas belonging to the same group have a pointer with respect to the same data. The differential data includes original index data and differential data for changing the original data. In the index data structure of FIG. 36, a destination area M has a pointer to index data a, and a destination area M' has a pointer to differential data b. In order to select index of the destination M', pointer data is read to obtain the differential data b as data corresponding to the destination area M'. After the differential data b is read, the index data a is read since the differential data b has the index data a as the original data. Thus, the index data a is changed by the differential data b into index of the destination area M'.

Though the original data is changed by the differential data only once in the index data structure shown in FIG. 36, it must be noted that the processing may be carried out in several steps. For example, it is assumed that a pointer of a destination area M" shows differential data c, and original data of c is the differential data b. In this case, in order to obtain index data of the destination area M", the differential data c is read, the differential data b serving as the original data of c is read, and the index data a serving as the original data of b is read. The index data a is changed by the differential data b, and is changed by the differential data c, resulting in the index of the destination area M".

Alternatively, entire index of the network division may concurrently be read. In this case, an amount of data read by path search index data searching means becomes larger, while the number of times the data is read is only once. Consequently, a time required for data transfer can be reduced to reduce a time required for the search. Since only partial data of the entire index of the network division is required for the search, it is possible to use an unnecessary memory area for other purposes after required index data is read.

In this case, there is one method of reducing the amount of concurrently read data, in which the destination area is divided into several large divisions to create index data for each large division. For example, an entire road network is divided into the east side and the west side, and index data to the destination area on the east side and index data to the destination area on the west side are created as index of each network division. At a time of the search, data to be read is changed according to the division in which the destination area is located. Alternatively, instead of the static division as described above, there is another variable dividing method in which one destination area located within a predetermined distance from an own division (or one destination area located in the division) is distinguished from the other destination area in each network division.

As set forth above, according to the on-vehicle path guide apparatus in the embodiment 13, the new path search index data structure is employed in which the capacity of the external storage unit can be reduced, that is, the load can be reduced while keeping the amount of read data small. As a result, it is possible to reduce the amount of data read when the search is made for the recommended path, and reduce the memory size of the path search index data storage means serving as the external storage unit.

Embodiment 14

Since an on-vehicle path guide apparatus according to the embodiment 14 is identical with the on-vehicle path guide apparatus according to the embodiment 1 shown in FIG. 1, descriptions thereof are omitted.

Figure 37:
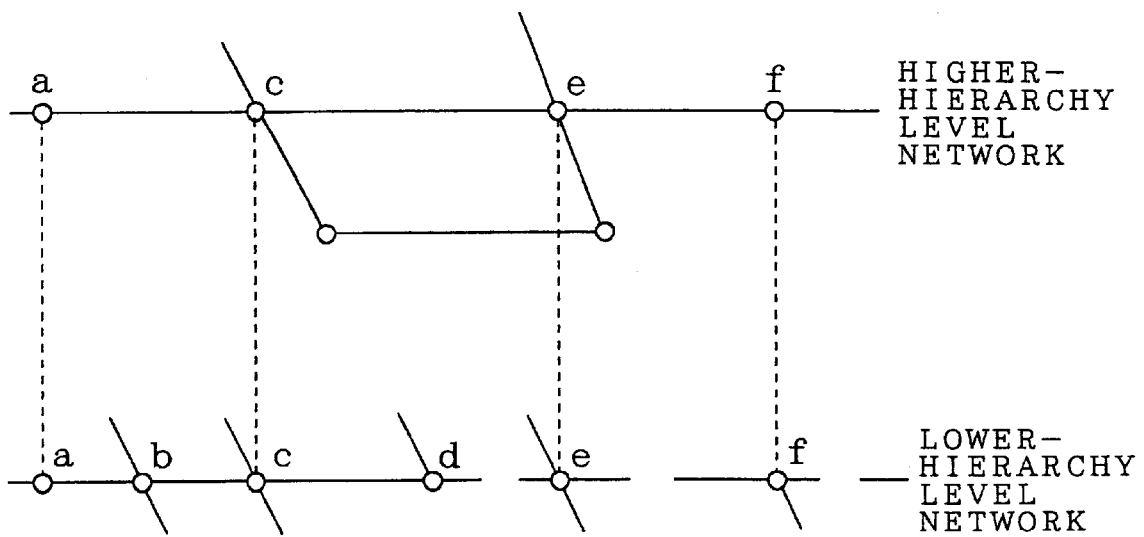
FIG. 37 is an explanatory view showing illustrative higher-hierarchy level network and lower-hierarchy level network.

When a search is made for a recommended path with a long distance from a start point to a destination, the search is made by using road network data having the hierarchical structure which is used in the index data structure according to the embodiment 5. At a time of the search, when a higher-hierarchy level road network does not appropriately include an optimal recommended-path having a long distance, another search is temporarily made while referring to a lower-hierarchy level network data in the course of the search in the higher-hierarchy level road network. For example, it is assumed that the optimal recommended-path in a certain search includes intersections a, b, c, d, e, and f in alphabetical order as shown in an explanatory view of FIG. 37.

Here, when roads corresponding to cd and de can not be found in the higher hierarchy road network, a search is made to the intersection c in the higher hierarchy road network. Thereafter, the operation temporarily moves down to a lower hierarchy network to make a search up to the intersection e, and moves up to the higher hierarchy road network once again to make a search to the intersection f. When the operation moves between levels in the network, network data and index data should frequently be read, resulting in an increased search time. Hence, before the higher-hierarchy level road network is created, it is necessary to consider such that the road network can include the optimal path shown by the index data in the search for the long distance.

In the on-vehicle path guide apparatus according to the embodiment 14, higher-hierarchy level road network data is created such that a recommended path with a long distance to a destination can include many optimal recommended-paths by using optimal recommended-path data obtained by a previous search, and is stored in path search index data storage means 5. Thus, the search time for the recommended path can be reduced by using the higher-hierarchy level road network data.

A description will now be given of the operation.

Figure 38:
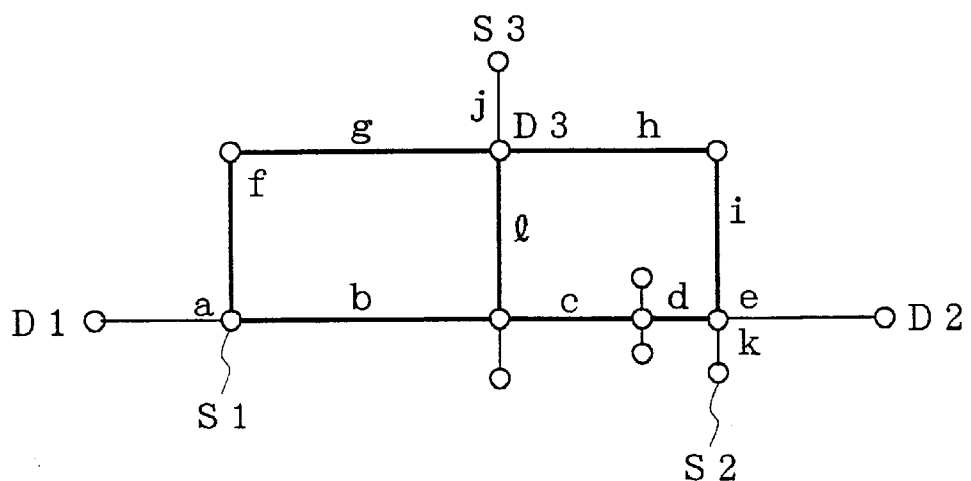
FIG. 38 is an explanatory view showing an illustrative higher-hierarchy level road network.
Figure 39:
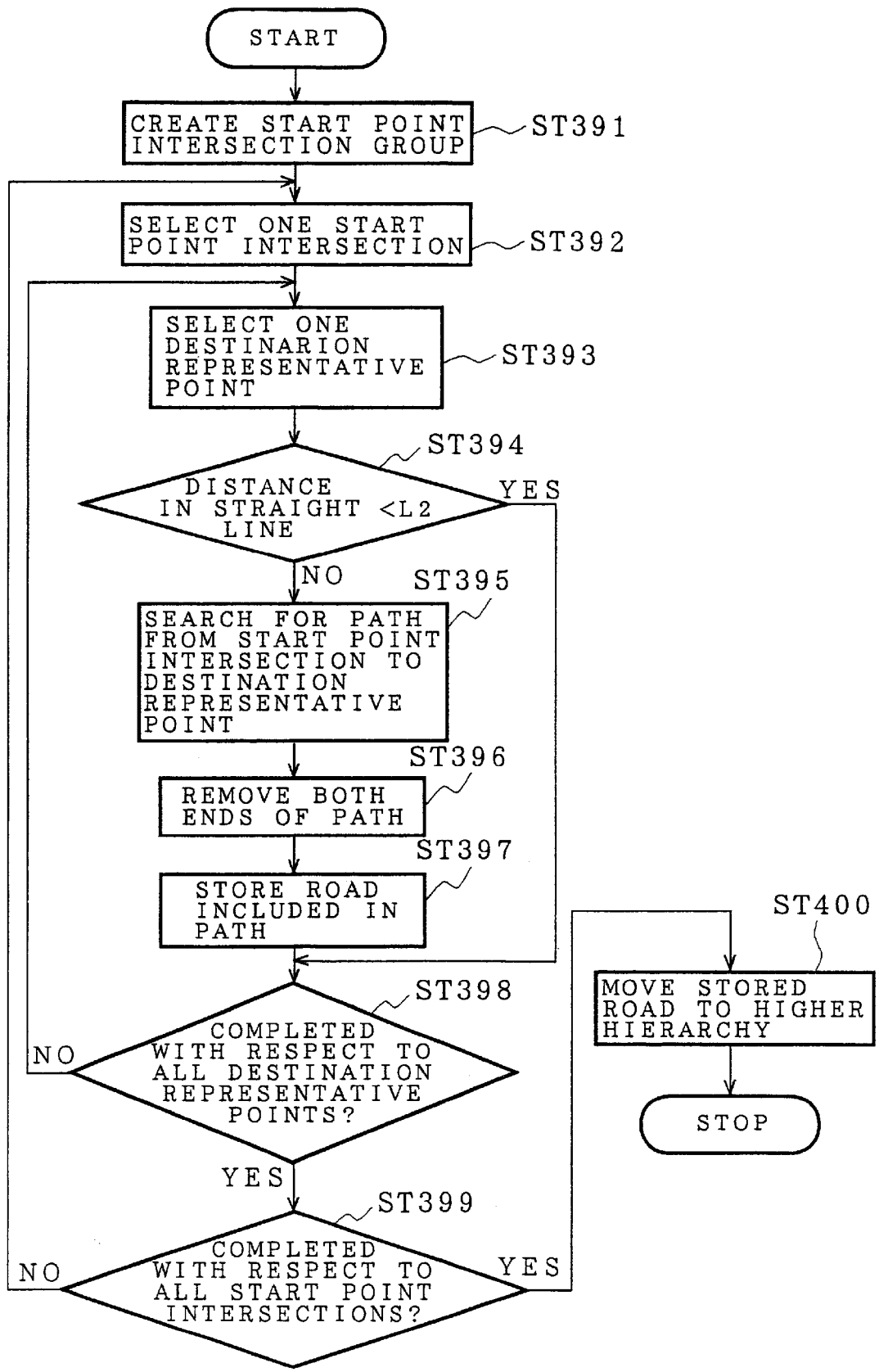
FIG. 39 is a flowchart showing the operation of an on-vehicle path guide apparatus according to the embodiment 14 of the present invention.

FIG. 39 is a flowchart showing the operation of the on-vehicle path guide apparatus according to the embodiment 14. FIG. 38 is a diagram showing a higher hierarchy road network obtained by the operation shown in FIG. 39. A description will be given of a procedure for creating the higher hierarchy road network by using index data in a lower-hierarchy level road network area.

First of all, a start point intersection group is created (step ST391). The start point intersection group may include all intersections located in the road network area, or may include several representative intersections sampled in each network division. After one intersection is selected from the start point intersection group, the following processing are carried out (step ST392).

One destination area is selected from among destination areas (step ST393). If a distance between a start point intersection and the destination area is equal to or less than L2, the operation proceeds to step ST398 (step ST394). A path from the start point intersection to a destination representative point in the selected destination area is selected by sequentially using indexes to the destination area (step ST395). From the selected path are removed a road having a road length from the start point intersection within a specified distance L3, and a road having a road length up to the destination representative point within a specified distance L4 (step ST396). A remaining intermediate road is stored as a road to be included in the higher hierarchy network (step ST397).

If any other destination area can be found with respect to the start point intersection, the operation returns to step ST393 (step ST398). If the operations with respect to all the destination areas are completed, the operation returns to step ST392 (step ST399). If the operations with respect to all combinations are completed, the higher hierarchy road network is created by carrying out the logical OR between the roads stored in step ST397 (step ST340).

FIG. 38 shows an illustrative higher hierarchy road network obtained by performing the OR operation. In FIG. 38, the start point intersection group includes intersections S1, S2, and S3, and destination representative points D1, D2, and D3. Since the destination representative point D1 is located within a specified distance from the start point intersection S1, paths to D2 and D3 are found instead of a path to D1. An optimal path from S1 to D2 includes b, c, d, and e. Except roads located within the specified distance on the start point side and the destination side, b, c, and d are stored as roads to be included in the higher hierarchy network. Similarly, roads f and g in the path extending from S1 to D3 are stored. The same operation is performed with respect to the start point intersections S2 and S3. As a result, the higher-hierarchy level includes the roads b, c, d, f, g, h, i, and 1.

As set forth above, according to the on-vehicle path guide apparatus in the embodiment 14, in case of the long distance from the start point to the destination, the higher-hierarchy level road network data used for the search for the recommended path is formed such that the recommended path to the destination can include the many optimal recommended-paths by using the optimal recommended-path data obtained by the previous search. As a result, it is possible to reduce the search time for the recommended path so as to rapidly indicate the recommended path to a passenger.

As set forth above, according to the present invention, the path search index data searching means searches for the recommended path from the main road closest to the current position to the main road closest to the destination by using the road network data in the path search road network data storage means and the path search index data stored in the path search index data storage means and created with the path information to each intersection as the index. As a result, there is an effect in that it is possible to indicate the result of search to the passenger at high speed.

Further, according to the present invention, the path information to each area is stored in the form of the path search index data in the path search index data storage means, and the path search index data searching means searches for the recommended path from the main road in the vicinity of the current position of the own vehicle to the area in which the destination is located by using the data. As a result, there are effects in that the path search control means controls switching between the path search index data searching means and the path search road network data searching means depending upon the distance from the start point to the destination so as to efficiently search for the recommended path at high speed and reduce the amount of the index data.

Further, according to the present invention, even while the path search index data searching means searching for the recommended path to the destination, the path search control means indicates the recommended path obtained by the search to the passenger each time the predetermined condition is met. As a result, there are effects in that it is possible to search for the recommended path from the start point to the destination at high speed, and rapidly indicate the recommended path to the passenger.

Further, according to the present invention, when the distance from the terminal link of the recommended path obtained by the search made by the path search index data searching means to the destination is equal to or less than the predetermined distance, the path search control means controls such that the path search road network data searching means searches for the recommended path to the destination by using the path search road network data. As a result, there are effects in that it is possible to search for the recommended path from the start point to the destination at high speed, and reduce the amount of index data.

Further, according to the present invention, the path search hierarchical index data searching means searches for the recommended path from the main road closest to the current position of the own vehicle to the main road closest to the destination by using the path search hierarchical index data. As a result, there is an effect in that it is possible to search for the recommended path from the start point to the destination at high speed.

Further, according to the present invention, the path search index data or the path search hierarchical index data includes, for example, the data showing that the toll road should preferentially be selected, the data showing that the toll road should not preferentially be selected, and the data showing that the path leading to the specified facilities should preferentially be selected. In view of the priority data desired by the passenger, the path search index data searching means or the path search hierarchical index data searching means searches for the recommended path. As a result, there is an effect in that it is possible to search for the recommended path from the start point to the destination depending upon the road characteristic desired by the passenger at high speed only by switching of the index data.

Further, according to the present invention, the path search control means controls such that the path search index data searching means searches for the recommended path by using the path search index data and the path search network data depending upon the direction in which the own vehicle travels from the nodes at the both ends of the link including the current position of the own vehicle, selects the recommended path having the lower cost value from among the obtained recommended paths from the nodes at the both ends so as to avoid the U-turn as far as possible, and indicates the path to the passenger through the indicating means. As a result, there is an effect in that it is possible to search for the recommended path from the start point to the destination at high speed in view of the direction in which the vehicle travels.

Further, according to the present invention, the data of the recommended path which has been obtained is stored in the recommended path storage means, the path deviation detecting means detects deviation of the current position from the recommended path, and the path search control means controls such that the path search index data searching means searches for the path from the point where the own vehicle deviates from the recommended path to the destination or the original recommended path by using the data of the recommended path and the path search index data. Even when the own vehicle deviates from the recommended path, the path to the destination or the original recommended path is provided for the passenger as far as possible. As a result, there is an effect in that it is possible to search for the path from the position of the vehicle or the start point to the destination or the original recommended path at high speed in view of the direction in which the vehicle travels even when the vehicle deviates from the recommended path obtained by the previous search.

Further, according to the present invention, the data of the recommended path is stored in the recommended path storage means, the path search control means sets the point on the recommended path within the predetermined range from the current position of the own vehicle as the destination, and the alternative path searching means makes the path search by setting the cost of the recommended path higher and efficiently searches for the alternative path. As a result, there are effects in that it is possible to, when the traffic jam or the like is generated on the recommended path, search for the new recommended path to bypass the recommended path at high speed by setting the point on the recommended path as the destination and making the path search with higher cost of the recommended path, and indicate the new recommended path to the driver.

Further, according to the present invention, the data of the recommended path is stored in the recommended path storage means. By using the traffic information received by the traffic information receiving means, the dynamic path searching means sets the point on the recommended path within the predetermined range from the current position of the own vehicle as the destination to calculate the recommended path cost in which the dynamic traffic information is reflected and make the path search. As a result, there are effects in that it is possible to search for the recommended path corresponding to the dynamic traffic situation such as traffic jam and regulation at high speed by setting the point on the recommended path as the destination and making the path search by using the cost in which the dynamic traffic information is reflected, and indicate the recommended path to the driver.

Further, according to the present invention, when the travel path deviates from the recommended path to the same destination the predetermined number of times or more, the index data changing means changes the path search index data such that the vehicle passes along the travel path, and the changed data is stored in the path search index data storage means. As a result, there are effects in that it is possible to store the alternative path, for example, chosen according to the driver's taste or frequently used to pass in the recommended path, and provide the alternative path for the passenger.

Further, according to the present invention, the path search control means makes the path search from the plurality of destination representative points selected from among the road network data to all the links in the network data, and the result of path search is stored in the path search control means. Further, the path search control means selects the destination representative point closest to the destination set by the setting means, searches the result of path search for selection of the recommended path until the own vehicle approaches the point at the predetermined distance from the destination, and sequentially reads the recommended path leading to the destination representative point. Further, the indicating means indicates the recommended path leading to the destination set by the setting means from the start point. As a result, there are effects in that it is possible to set the memory size smaller, and search for the recommended path at high speed.

Further, according to the present invention, the road on the road network data is divided into the plurality of groups which are geographically in close to each other. If there is the destination representative point providing completely the same optimal path in the group, the same path search index data to the destination representative point is representatively stored in the path search index data storage means. If there are the plurality of destination representative points having the small difference between the optimal paths in the group, the difference in optimal path data is calculated between the destination representative points. The path search index data in which one optimal path to the destination representative point is expressed by the differential data to the other optimal path is stored in the path search index data storage means. As a result, there are effects in that it is possible to set the memory size smaller, and search for the recommended path at high speed.

Further, according to the present invention, one case where the destination representative point is located inside the group is distinguished from the other case where located outside the group. The path search index data about the path to the destination representative point is divided to be stored in the path search index data storage means. As a result, there are effects in that it is possible to set the memory size smaller, and search for the recommended path at high speed.

Further, according to the present invention, in the path search index data storage means is stored the higher-hierarchy level road network data for retrieving the long-distance destination point obtained by selecting the many roads included in the optimal path leading to the destination representative point at the long distance from among the data of the optimal path obtained by the previous search. As a result, there is an effect in that it is possible to search for the recommended path at high speed by using the higher-hierarchy level road network data.

Further, according to the present invention, there is provided the path search method including the steps of searching for the recommended path from the link closest to the current position of the own vehicle to the main link closest to the destination by using the network data about the road attribute and the connection of the main road and the path search index data serving as the path information between the link and the node, and indicating the recommended path obtained by the search to the passenger. As a result, there is an effect in that it is possible to search for the recommended path at high speed.

Further, according to the present invention, one search method of searching for the recommended path from the link closest to the current position of the own vehicle to the main link closest to the destination by using the path search index data, and the other search method by using the path search road network data are selectively used depending upon the distance to the destination. As a result, there are effects in that it is possible to efficiently search for the recommended path at high speed, and indicate the recommended path to the passenger.

Further, according to the present invention, each time the predetermined condition is met during the search for the recommended path to the destination, the recommended path obtained during the search for the recommended path is provided for the passenger whenever necessary. As a result, there is an effect in that it is possible to efficiently and rapidly indicate the recommended path to the passenger.

Further, according to the present invention, when the distance from the terminal link of the recommended path to the destination is equal to or less than the predetermined distance, the search is made for the recommended path by using the path search road network data. As a result, there is an effect in that it is possible to efficiently search for the recommended path.

While preferred embodiments of the invention have been described using specific terms, such description is for illustrative purposes only, and it is to be understood that changes and variations may be made without departing from the spirit or scope of the following claims.

What is claimed is:

1. An on-vehicle path guide apparatus comprising:
   current position detecting means for detecting a current position of an own vehicle;
   setting means for setting a destination;
   path search road network data storage means in which network data showing a road attribute and connection of a road is stored;
   path search index data storage means for storing path information about whether or not each link connection to a node may reach other nodes as path search index data;
   path search index data searching means for searching for and obtaining a recommended path from a node near the current position to a node near the destination by selecting a link that may reach the node near the destination based on path search road network data and the path search index data; and
   path search control means for controlling the operations of the current position detecting means, the setting means, the path search road network data storage means, and the path search index data searching means, and providing to a passenger the obtained recommended path through an indicating means.

2. An on-vehicle path guide apparatus according to claim 1,
   wherein, even while the path search index data searching means is searching for a recommended path to the destination, the path search control means indicates the recommend path obtained by the search through the indicating means each time a predetermined condition is met.

3. An on-vehicle path guide apparatus according to claim 1,
   wherein, when a distance from a terminal link of the recommended path obtained by a search made by the path search index data searching means to the destination is equal to or less than a predetermined distance, the path search control means selects the path search road network data searching means to search for the recommended path to the destination by using path search road network data.

4. An on-vehicle path guide apparatus according to claim 1, further comprising a means for storing path search hierarchical index data in which path search hierarchical index data including hierarchical path information to each area is stored; and path search hierarchical index data searching means for searching for and obtaining a recommended path from a main road closest to the current position of the own vehicle to a main road closest to the destination by using the path search hierarchical index data.

5. An on-vehicle path guide apparatus according to claim 4, wherein path search index data stored in any one of the path search index data storage means and path search hierarchical index data stored in the means for storing path search hierarchical index data includes data showing that a toll road should preferentially be selected, data showing that the toll road should not preferentially be selected, and data showing that a path leading to specified facilities should preferentially be selected.

6. An on-vehicle path guide apparatus according to claim 1, further comprising a means for storing path search hierarchical index data in which path search hierarchical index data including hierarchical path information to each area is stored, wherein path search index data stored in any one of the path search index data storage means and path search hierarchical index data stored in the means for storing path search hierarchical index data, includes data showing that a toll road should preferentially be selected, data showing that the toll road should not preferentially be selected, and data showing that a path leading to specified facilities should preferentially be selected.

7. An on-vehicle path guide apparatus according to claim 1, wherein the path search control means controls such that the path search index data searching means searches for the recommended path by using path search index data and path search network data depending upon a direction in which an own vehicle travels from nodes at both ends of a link including the current position of the own vehicle, and selects a recommended path having a lower cost value from among the obtained recommended paths from the nodes at the both ends so as to indicate the recommended path through the indicating means.

8. An on-vehicle path guide apparatus according to claim 1, further comprising:

recommended path storage means in which data of the recommended path obtained by a search is stored; and path deviation detecting means for detecting that the current position of the own vehicle detected by the current position detecting means deviates from the recommended path, wherein the path search control means selects the path search index data searching means to search for a path from a point where the own vehicle deviates from any one of the recommended path to the destination and the original recommended path by using data of the recommended path and path search index data.

9. An on-vehicle path guide apparatus according to claim 1, further comprising:

recommended path storage means in which data of a recommended path is stored; and alternative path searching means for setting a point on the recommended path within a predetermined range from the current position of the own vehicle as a destination, and for searching an alternative path by setting a cost, indicating a degree of difficultly in driving, that is higher than a cost for other path.

10. An on-vehicle path guide apparatus according to claim 1, further comprising:

recommended path storage means in which data of a recommended path is stored;

traffic information receiving means for receiving traffic information; and dynamic path searching means for setting a point on the recommended path within a predetermined range from the current position of the own vehicle as a destination to calculate a recommended path cost in which the traffic information is reflected, and searching for the recommended path.

11. An on-vehicle path guide apparatus according to claim 1, further comprising:

recommended path storage means in which data of a recommended path is stored;

path deviation detecting means for detecting that the current position of the own vehicle deviates from the recommended path;

deviation travel path storage means in which a travel path after the own vehicle deviates from the recommended path and a destination are stored; and index data changing means for changing path search index data such that the vehicle passes along the travel path when the travel path deviates from the recommended path to the same destination the predetermined number of times or more, and storing the changed data in path search index data storage means.

12. An on-vehicle path guide apparatus according to claim 1, wherein the path search control means makes a path search from a plurality of destination representative points selected from among road network data stored in the path search road network data storage means to all links in the network data storage means to all links in the network data so as to store a result of path search, selects a destination representative point closest to a destination set by the setting means, searches the result of path search for selection of a recommended path until the own vehicle approaches a point at a predetermined distance from the destination, sequentially reads a recommended path leading to the destination representative point, and controls the indicating means to indicate the recommended path leading to the destination set by the setting means from a start point.

13. An on-vehicle path guide apparatus according to claim 1, wherein a road described by road network data is divided into a plurality of groups which are geographically in close proximity to each other, if there is a destination representative point providing completely the same optimal path in the group, the same path search index data to the destination representative point being representatively stored in the path search index data storage means, if there are a plurality of destination representative points having a small difference between the optimal paths in the group, a difference in optimal path data being calculated between the destination representative points, and path search index data in which on optimal path to the destination representative point is expressed by differential data to the other optimal path being stored in the patch search index data storage means.

14. An on-vehicle path guide apparatus according to claim 13, wherein said path search index data storage means stores path search index data for paths to said destination representative points that are divided corresponding to following two cases (a) and (b):

(a) said destination representative points are located in said group; and (b) said destination representative points are located in outside of said group.

15. An on-vehicle path guide apparatus according to claim 1, wherein in the path search index data storage means is stored higher-hierarchy level road network data for retrieving a long-distance destination point obtained by selecting many roads included in an optimal path leading to a destination representative point at a long distance from among data of an optimal path obtained by a previous search, and the indicating means indicating a wide-area map obtained depending upon the higher-hierarchy level road network data.

16. An on-vehicle path guide apparatus comprising: current position detecting means for detecting a current position of an own vehicle;

path search road network data storage means in which network data showing a road attribute and connection of a road is stored;

path search index data storage means in which path information between nodes is stored as path search index data;

path search index data searching means for searching for and obtaining a recommended path from a node near the current position to a node near the destination by using path search road network data and the path search index; and path search control means for controlling the operations of the current position detecting means, the setting means, the path search road network data storage means and the path search index data searching means, and providing to a passenger the obtained recommended path through an indicating means, wherein path information to each area encompassing said nodes is stored in the form of path search index data in the path search index data storage means, and the path search index data searching means searches for a recommended path from a main road in the vicinity of the current position of the own vehicle to an area in which the destination is located by using the path search index data.

17. A path search method comprising the steps of:

detecting a current position of an own vehicle;

setting a destination;

searching for a recommended path from a node near the current position of the own vehicle to a node near the destination by selecting a link that may reach the node near the destination by using network data about a road attribute and connection of a main road and path search index data as path information showing whether or not each link connected to a node may reach other nodes; and indicating the recommended path obtained by the search to a passenger.

18. A path search method according to claim 17, wherein a search method of searching for the recommended path from the node closest to the current position of the own vehicle to the main node link closest to the destination is selected depending upon a distance to the destination, by using any one of the path search index data and a search method for searching by using path search road network data.

19. A path search method according to claim 17, wherein, each time a predetermined condition is met during a search for a recommended path to the destination, the recommended path obtained during the search for the recommended path is provided for a passenger whenever necessary.

20. A p path search method according to claim 17, wherein, when a distance from a terminal link of the recommended path to the destination is equal to or less than a predetermined distance, a search is made for the recommended path by using path search road network data.

* * * * *